United States Patent
Novotny

(10) Patent No.: US 7,054,519 B1
(45) Date of Patent: May 30, 2006

(54) RECONFIGURABLE OPTICAL ADD DROP MULTIPLEXERS WITH INTEGRATED POWER EQUALIZATION

(75) Inventor: Vlad Novotny, Los Gatos, CA (US)

(73) Assignee: Active Optical Networks, Inc., Fremont, CA (US)

( * ) Notice: Subject to any disclaimer, the term of this patent is extended or adjusted under 35 U.S.C. 154(b) by 0 days.

(21) Appl. No.: 10/611,162

(22) Filed: Jun. 30, 2003

Related U.S. Application Data

(60) Provisional application No. 60/453,677, filed on Mar. 10, 2003.

(51) Int. Cl.
*G02B 6/26* (2006.01)
*G02B 6/42* (2006.01)

(52) U.S. Cl. ............................ 385/16; 385/15; 385/19; 385/20; 385/21; 385/22; 385/25; 385/31; 385/39; 385/52; 385/140

(58) Field of Classification Search ................. 385/16, 385/25, 50, 129–132
See application file for complete search history.

(56) References Cited

U.S. PATENT DOCUMENTS

| | | |
|---|---|---|
| 4,813,757 A | 3/1989 | Sakano et al. |
| 4,978,189 A | 12/1990 | Blonder et al. |
| 5,506,394 A | 4/1996 | Plesko |
| 5,724,015 A | 3/1998 | Tai et al. |
| 5,841,917 A | 11/1998 | Jungerman et al. |
| 5,943,454 A | 8/1999 | Aksyuk et al. ............... 385/22 |
| 5,974,207 A | 10/1999 | Aksyuk et al. ............... 385/24 |
| 6,021,248 A | 2/2000 | Cornish et al. ............. 385/147 |
| 6,035,080 A | 3/2000 | Henry et al. .................. 385/24 |
| 6,122,416 A | 9/2000 | Ooba et al. ................... 385/16 |
| 6,172,817 B1 | 1/2001 | Senapati et al. |
| 6,204,946 B1 | 3/2001 | Aksyuk et al. ............. 359/131 |
| 6,222,656 B1 | 4/2001 | Eu ............................... 359/127 |
| 6,282,361 B1 | 8/2001 | Nishimura et al. ......... 385/140 |
| 6,337,760 B1 | 1/2002 | Huibers et al. |
| 6,351,581 B1 | 2/2002 | Doerr et al. .................. 385/24 |
| 6,429,023 B1 | 8/2002 | Gharavi ..................... 436/167 |
| 6,430,331 B1 | 8/2002 | Hagelin et al. |
| 6,442,324 B1 | 8/2002 | Tei et al. .................... 385/140 |
| 6,445,844 B1 | 9/2002 | Neukermans et al. |
| 6,453,087 B1 | 9/2002 | Frish et al. ................... 385/24 |
| 6,487,336 B1 | 11/2002 | Yao ............................. 385/24 |
| 6,517,997 B1 | 2/2003 | Roberts ....................... 430/322 |

(Continued)

OTHER PUBLICATIONS

Mechanical Devices Project #639-97, "MEMS Device Development." Joel Kubby. Cornell Nanofabrication Facility, National Nanofabrication Users Network. pp. 220 and 221.

(Continued)

*Primary Examiner*—Frank G. Font
*Assistant Examiner*—Ryan Lepisto
(74) *Attorney, Agent, or Firm*—Silicon Edge Law Group LLP; Arthur J. Behiel

(57) ABSTRACT

Described are various optical, opto-electrical and electrical components and subsystems. Some embodiments include input and output waveguides supporting opposing facets separated by a gap. The degree to which the opposing facets are aligned with respect to one another controls the light intensity in the output waveguide. An active closed-loop control mechanism dynamically controls the extent of waveguide alignment to maintain a desired output intensity. In other embodiments, the path between opposing facets can be selectively blocked by a micro blade. Still other embodiments combine switching with optical power equalization for ease of integration.

21 Claims, 25 Drawing Sheets

U.S. PATENT DOCUMENTS

| | | | |
|---|---|---|---|
| 6,522,803 B1 | 2/2003 | Nakajima et al. | 385/24 |
| 6,522,805 B1 | 2/2003 | Luff | 385/30 |
| 6,539,148 B1 | 3/2003 | Kim et al. | 385/27 |
| 6,542,665 B1 | 4/2003 | Reed et al. | |
| 6,549,688 B1 | 4/2003 | Bazylenko | 385/14 |
| 6,549,691 B1 | 4/2003 | Street et al. | |
| 6,553,175 B1 | 4/2003 | Jaspan | 385/140 |
| 6,560,396 B1 | 5/2003 | Yan et al. | 385/140 |
| 6,563,965 B1 | 5/2003 | Al-hemyari | 385/3 |
| 6,580,863 B1 | 6/2003 | Yegnanarayanan et al. | 385/132 |
| 6,628,857 B1 | 9/2003 | Bonadeo et al. | |
| 6,697,547 B1 | 2/2004 | Walter et al. | |
| 6,707,594 B1 | 3/2004 | Holmes | |
| 6,760,505 B1 | 7/2004 | Street et al. | |
| 2002/0054748 A1* | 5/2002 | Hsu | 385/140 |
| 2002/0076655 A1 | 6/2002 | Borrelli et al. | |
| 2003/0031451 A1 | 2/2003 | Hong et al. | |
| 2003/0053743 A1 | 3/2003 | Liu et al. | |
| 2003/0086641 A1* | 5/2003 | Kubby et al. | 385/24 |

OTHER PUBLICATIONS

Cutting-edge Technologies, "Successful Fabrication of Large-Scale 1,000-Channel Optical Multiplexer/Demultiplexers," (Photonics Laboratories) and "High-Speed Operation of a Thermo-Capillary Optical Switch (Olive)" (Telecommunications Energy Laboratories). p. 33.

NEC Corporation, "Future Optoelectronic Devices for Communications and Interconnections." Masao Fukuma (Stanford University), Apr. 10, 2003.

"Optical MEMS Platform for low Cost On-Chip Integration of Planar Light Circuits and Optical Switching," by Joel Kubby, et al. 3 pages.

Slide Show, "MEMS 2003 and Beyond A Vision of the Future of MEMS," by Albert (AL) P. Pisano, Ph.D. Jan. 23, 2002. 16 pages.

Journal of Lightwave Technology, vol. 17, No. 5, "Wavelength Add-Drop Switching Using Tilting Micromirrors." By Joseph E. Ford et al. May 1999. pp. 904-911.

* cited by examiner

RECONFIGURABLE OPTICAL ADD DROP MULTIPLEXERS WITH INTEGRATED POWER EQUALIZATION

CROSS-REFERENCE TO RELATED APPLICATIONS

This patent application claims benefit under 35 U.S.C. 119(e) from the U.S. Provisional Patent Application Ser. No. 60/453,677, entitled "Reconfigurable Optical Add-Drop Multiplexers Based on 1×2 and 2×2 Switches," by Vlad J. Novotny, filed on Mar. 10, 2003.

BACKGROUND

FIG. 1 (prior art) depicts a conventional Reconfigurable Optical Add Drop Multiplexer (ROADM) 100 suitable for processing a Wavelength Division Multiplexed (WDM) signal 105 having N wavelength channels. ROADM 100 receives, as input, WDM signal 105 carried on waveguide 110. WDM signal 105 is received by port 115 of optical circulator 120. The operation of optical circulator 120, a device known in the art, is such that an optical signal, such as WDM signal 105, is delivered to the next port along circulation direction 125, which is port 130. From port 130, signal 105 is launched along waveguide 135 towards a device suitable for separating or demultiplexing WDM signal 105 into its constituent spectral components $105_1$–$105_N$. A waveguide grating router (WGR) 140, such as an Arrayed Waveguide Grating (AWG) or an array of thin film filters or Fiber Bragg Gratings, demultiplexes WDM signal 105 into its N spectral components.

The N spectral components of WDM signal 105 appear on the outputs of WGR 140 and are carried by waveguides $142_1$–$142_N$ to N 1×1 switches $S1_1$—$S1_N$. These switches either reflect or pass light, as directed by control signals (not shown). In the reflective state, a reflective device, such as a metal or dielectric mirror, is positioned in the optical path of the spectral component traveling through a switch. For example, switch $S1_2$ is shown in a substantially reflective state, in which case a reflective device 145 causes substantially all optical energy of spectral component $105_2$ to be reflected back along waveguide $142_2$ to WGR 140. Spectral component $105_2$ passes through WGR 140 and emerges on waveguide 135, and is delivered to port 130 of optical circulator 120. Optical circulator 125 advances the spectral component to port 150 for "drop." In this manner, one or more spectral components can be dropped from a WDM signal.

In the transmissive state, the reflective device is positioned out of the optical path of the respective spectral component. Thus, spectral components entering switches that are in a substantially transmissive state, such as switch $S1_1$, pass through those switches undisturbed and are launched into waveguides, such as waveguide $155_1$, leading to a second WGR 160. Spectral components entering the WGR 160 are recombined or remultiplexed. Remultiplexed signal 165 appears at the output of WGR 160 and is launched into waveguide 170 and delivered to port 175 of second optical circulator 180. Optical circulator 180 delivers WDM signal 165 to port 185 and into waveguide 190 for transmission to a network node or the like.

One or more spectral components can be added to the original group of spectral components $105_1$–$105_N$ comprising WDM signal 105 (less any dropped spectral components). Such addition is accomplished by delivering the spectral components to be added to port 195 of optical circulator 180. For clarity of description, the addition of only one spectral component $105_{N+1}$ is described below. It should be understood, however, that the N switches can add N spectral components, assuming a like number of spectral components are dropped from the original signal.

The one additional spectral component $105_{N+1}$ is advanced from port 195 to port 175 and launched into waveguide 170 towards the WGR 160. The WGR 160 delivers the spectral component onto the appropriate one of waveguides $155_1$–$155_N$ as a function of wavelength. Spectral component $105_{N+1}$ is assumed to have a wavelength appropriate for occupying the channel vacated by dropped spectral component $105_2$. As such, spectral component $105_{N+1}$ is launched into waveguide $155_2$ and encounters switch $S1_2$.

Recall that switch $S1_2$ is in a substantially reflective state to effect the above-described "drop" of spectral component $105_2$. As such, spectral component $105_{N+1}$ is likewise reflected upon entering the switch $S1_2$, but towards WGR 160, there to be multiplexed along with other spectral components 105, and $105_3$–$105_N$ into WDM signal 165.

FIG. 2 (prior art) depicts a conventional ROADM 200 similar to ROADM 100 of FIG. 1, like-labeled elements being the same. Unlike ROADM 100, however, ROADM 200 is adapted to equalize the output power of the spectral components on waveguides $1551_1$–$155_N$. To accomplish this, variable-optical attenuators $205_1$–$205_N$ are inserted into waveguides $155_1$–$155_N$. For a detailed discussion of a ROADM with equalization, see U.S. Pat. No. 6,539,148 to Kim et al., which is incorporated herein by reference.

FIG. 3 (prior art) depicts a second conventional ROADM 300 in which N 2×2 switches $S2_1$–$S2_N$ replace the 1×1 switches of ROADM 100. When using 2×2 switches $S2_1$–$S2_N$, optical circulators 120 and 180 used in conjunction with the 1×1 switches of the first illustrative embodiment are no longer required, as is described below.

ROADM 300 receives a WDM signal 105 via a waveguide 135. A 1×N WGR 140 demultiplexes WDM signal 105 into its constituent spectral components $105_1$–$105_N$. The N spectral components of WDM signal 105 appear on the outputs of WGR 140 and are carried by waveguides $142_1$–$142_N$ to N 2×2 switches $S2_1$–$S2_N$. Each switch $S2_1$—$S2_N$ can be either a constant-reflectivity device or a variable-reflectivity device. If a variable-reflectivity device is used, the switching function is obtained, i.e., the path of an optical signal traveling therethrough is changed, by a controlled change in reflectivity, such as between substantially transmissive and substantially reflective. If a constant-reflectivity mirror is used, the switching function is obtained by moving the mirror into and out of the path of an optical signal traveling through the switch, again placing the switch in respective substantially reflective or transmissive states. Such movement is actuated, in some embodiments, by a Micro Electro Mechanical Systems (MEMS) based actuator.

The switches may be placed, on an individual basis, in a transmissive state, wherein optical director 305 is substantially "invisible" to a spectral component traveling therethrough. Alternatively, the switches may be placed, again on an individual basis, in a reflective state, wherein optical director 305 reflects a substantial portion of a spectral component incident thereon.

The disposition of each spectral component $105_1$–$105_N$, i.e., dropping or passing signal to output 165, is controlled by respective associated 2×2 switch $S2_1$–$S2_N$. The switches have two inputs and two outputs. First input IN1 of each switch receives one of spectral components $105_1$–$105_N$ delivered to it from one of waveguides $142_1$–$142_N$. If the switch is in a transmissive state, the one spectral component crosses the switch and is coupled into first output OUT1 for delivery to WGR 160 along appropriate waveguide $155_1$–$155_N$.

For example, switch $S2_1$ is in a transmissive state. Spectral component $105_1$ delivered to input IN1 of switch $S2_1$ via waveguide $142_1$ crosses the switch, couples to output OUT1 of switch $S2_1$ and is launched into waveguide $155_1$. Thus, spectral components, such as component $105_1$, entering switches that are in a transmissive state, traverse such switches undisturbed and are launched into waveguides, such as waveguide $155_1$, leading to a second (N×1) WGR 160. Spectral components entering the WGR 160 are recombined or multiplexed therein. Multiplexed signal 165 appears at the output of WGR 160 and is launched into waveguide 170 for transmission to a network node or the like.

If the switch is in a reflective state, the one spectral component received at input IN1 is coupled into second output OUT2 and launched into waveguide $310_i$ for drop. For example, in the exemplary embodiment of a ROADM 300, switch $S2_2$ is in a reflective state. Spectral component $105_2$ delivered to input IN2 of the switch $S2_2$ via waveguide $142_2$ encounters optical director 305. Upon contact with optical director 305, spectral component $105_2$ is reflected towards, and coupled with high efficiency into, second output OUT2 of switch $S2_2$ and launched into waveguide $310_2$ for drop.

For switches that are in a reflective state, second input IN2 can be used for adding a spectral component to the WDM signal. The added spectral component is delivered to IN2 via "add" waveguide $315_i$, and is then coupled into first output OUT1 and launched into waveguide $155_i$. For example, in switch $S2_2$, spectral component $105_{N+1}$ is added by delivering it to add waveguide $315_2$. As spectral component $105_{N+1}$ encounters optical director 305, it is reflected towards, and couples with high efficiency into, waveguide $155_2$. The spectral component is delivered to second WGR 160 and is multiplexed, along with spectral components $105_1$ and $105_3$–$105_N$, into output signal 165.

For a more detailed discussion of conventional ROADMs, see U.S. Pat. No. 5,974,207 to Aksyuk et al., which is incorporated herein by reference.

Conventional optical systems are bulky and expensive. (See "Optical MEMS platform for low cost on-chip integration of planar light circuits and optical switching," by Joel Kubby et al., of Xerox Corporation (2002), which is incorporated herein by reference). Kubby et al. pointed to component integration as one way to significantly reduce prices. To that end, Kubby et al. proposed a Silicon-On-Insulator (SOI) platform for integrating optical, mechanical, and electrical functions. There nevertheless remains a need for small, reliable optical components and switching systems that can be produced with reduced per-channel costs.

SUMMARY

The present invention addresses the need for small, reliable optical subsystems that can be integrated to produce reconfigurable optical add drop multiplexers and other optical devices with improved manufacturability and performance. Some embodiments include actuated input and output waveguides supporting opposing facets separated by a gap. The degree to which the opposing facets are aligned with respect to one another controls the light intensity in the output waveguide. An active closed-loop control mechanism dynamically controls the extent of waveguide alignment to maintain a desired output intensity.

Some embodiments combine optical switching and attenuation to facilitate optical system integration. An ADD/DROP switch in accordance with one such embodiment includes two switch positions: IN->OUT and IN->DROP/ADD->OUT. Each switch position is variable to provide a degree of variable optical attenuation. Combining switching with attenuation advantageously reduces the expense and complexity of components required to build a number of optical systems. In the IN->OUT position, an active closed-loop control mechanism can be used to dynamically control the extent of waveguide alignment to maintain a desired output intensity. A pair of active, closed-loop control mechanisms can be used in the IN->DROP/ADD->OUT switch position: a first control loop dynamically controls the extent of misalignment between input and output waveguides to maintain the output intensity at a first desired level, while a second control loop dynamically controls the light intensity of an add signal to maintain the drop intensity at a second desired level.

Some embodiments employ actuated micro-blade structures to create both Variable Optical Attenuator (VOA) and switch structures. In VOA embodiments, actuators precisely control the extent to which the blade interferes with an optical beam, and thereby provide variable optical attenuation. Each actuator includes a counterbalance opposite the blade to reduce sensitivity to vibration and orientation. In switch embodiments, the blade either reflects light when intersecting an optical path or allows transmission when removed from the optical path.

A 2×2 switch configuration in accordance with one embodiment includes two input/output waveguide pairs selectively separated by a micro blade. Each input waveguide can be coupled to either output waveguide by appropriate positioning of the micro blade. The output waveguides are offset with respect to beams transmitted from the input waveguides to compensate for reflected beam displacement that occurs due to blade thickness. The waveguides can be tapered to reduce the spacing between adjacent waveguide facets. A micro-blade actuated switch in accordance with an embodiment for use in add-drop multiplexers does not require offset output waveguides.

The foregoing switches, optical attenuators, and combination switch/attenuators are combined with other optical, electrical, and opto-electrical components to produce complex optical systems. Further, methods are described for forming opto-electrical subsystems capable of combining switching with variable attenuation.

This summary does not limit the invention, which is instead defined by the claims.

DETAILED DESCRIPTION

Figure 4A:
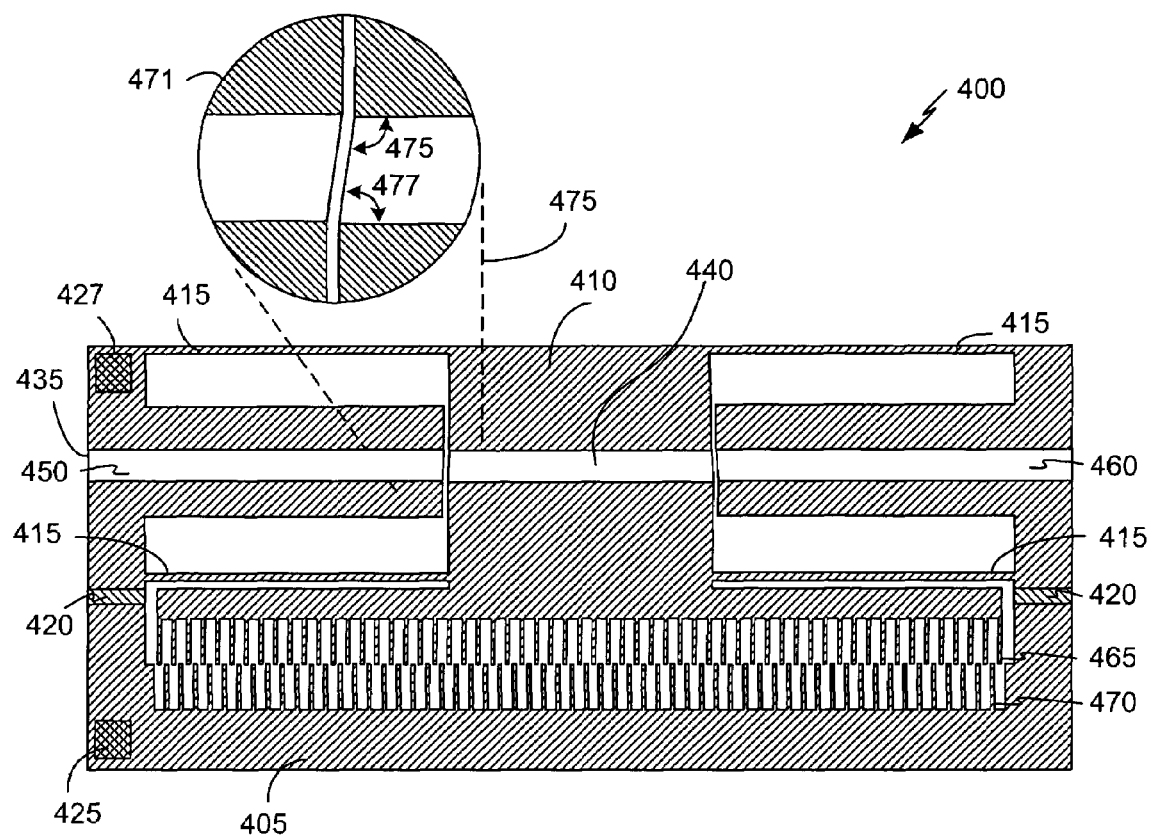
FIGS. 4A and 4B depict a variable optical attenuator (VOA) 400 in accordance with one embodiment.

FIG. 4A depicts a variable optical attenuator (VOA) 400 in accordance with one embodiment. VOA 400 is a monolithic device that includes a fixed portion 405 and a movable portion 410 interconnected via four springs 415. A waveguide made up of three waveguide segments 435, 440, and 460 extends over the bulk of VOA 400. Waveguide segment 440 within movable portion 410 can be misaligned with respect to stationary waveguide segments 450 and 460 to vary the amount of light transmitted through VOA 400.

The movable and stationary portions 410 and 405 are both conductive, typically fabricated using a doped semiconductor. Insulating portions 420, silicon dioxide or silicon nitride in one embodiment, electrically isolate the movable and fixed portions. A pair of contact pads 425 and 427 facilitates electrical connections to the movable and stationary portions.

Figure 4B:
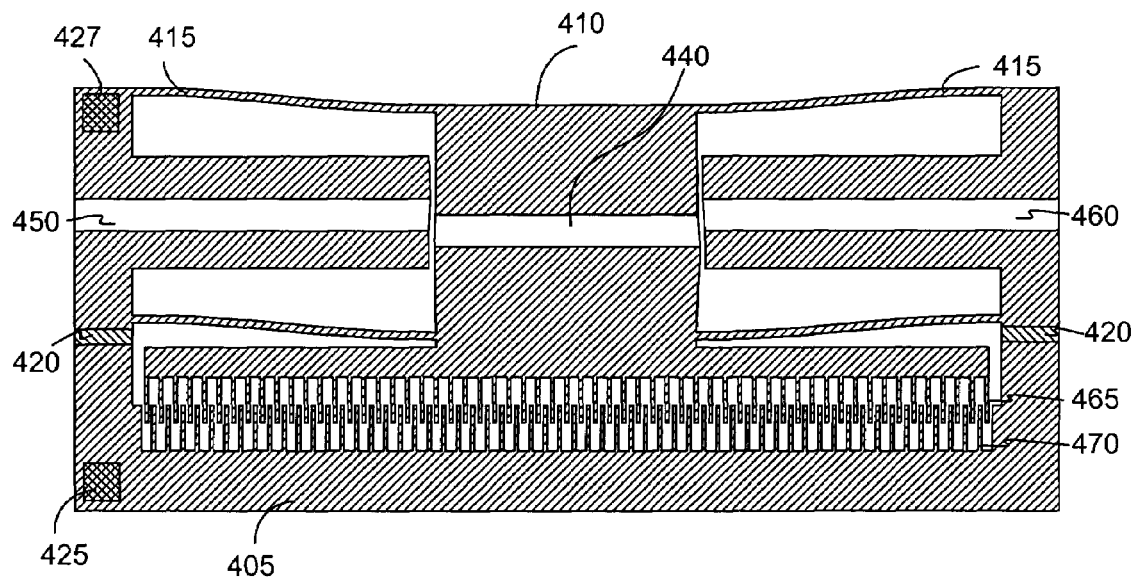

VOA 400 includes a translational comb actuator, which in turn includes a number of fixed teeth 470 interdigitated with corresponding movable teeth 465. Applying a voltage across pads 425 and 427 creates an electrostatic attraction between the movable and fixed teeth. This attraction pulls movable portion 410 toward fixed portion 405 to misalign waveguide segment 440 with respect to waveguide segments 460 and 450 in the manner depicted in FIG. 4B. The magnitude of the voltage across pads 425 and 427 dictates the degree of misalignment, and consequently the degree of optical attenuation.

As detailed below in connection with FIGS. 19A–W, the waveguides are formed using cores with higher refractive index surrounded by cladding layers (not shown) of lower refractive index. For example, one embodiment employs doped silicon dioxide waveguides and undoped silicon dioxide cladding layers. Other suitable waveguide materials include silicon, silicon nitride, silicon oxynitride, and indium phosphide.

FIG. 4A includes a magnified portion 471 of stationary waveguide segment 450 and movable waveguide segment 440 highlighting angles 475 and 477 of the end facets of these waveguide segments. Waveguide segment 460 is similarly faceted. Angles 475 and 477, about eight degrees away from normal to the optical path defined by waveguide segments 440 and 450, reduce undesirable internal reflections at the facets. These angles can be important due to the difficulty of applying effective anti-reflective coatings to the waveguide facets. The gaps between facets are about 2–5 microns in one embodiment. For maximum light transmission, the opposing facets of waveguide segments 440 and 450 and the opposing facets of waveguide segments 440 and 460 are offset as shown in magnified portion 471 to accommodate interface refraction.

In embodiments in which the movable waveguide segment is sufficiently flexible, one of the gaps can be eliminated to reduce internal reflections. The movable waveguide can double as a spring in such embodiments. In other embodiments, the teeth extend in parallel with the facet angles so that waveguide segment 440 is actuated in parallel with the facets. This configuration allows for slightly narrower gaps. Some embodiments employ an index-matching fluid that can be included between opposing facets, rendering angled facets unnecessary.

Figure 5:
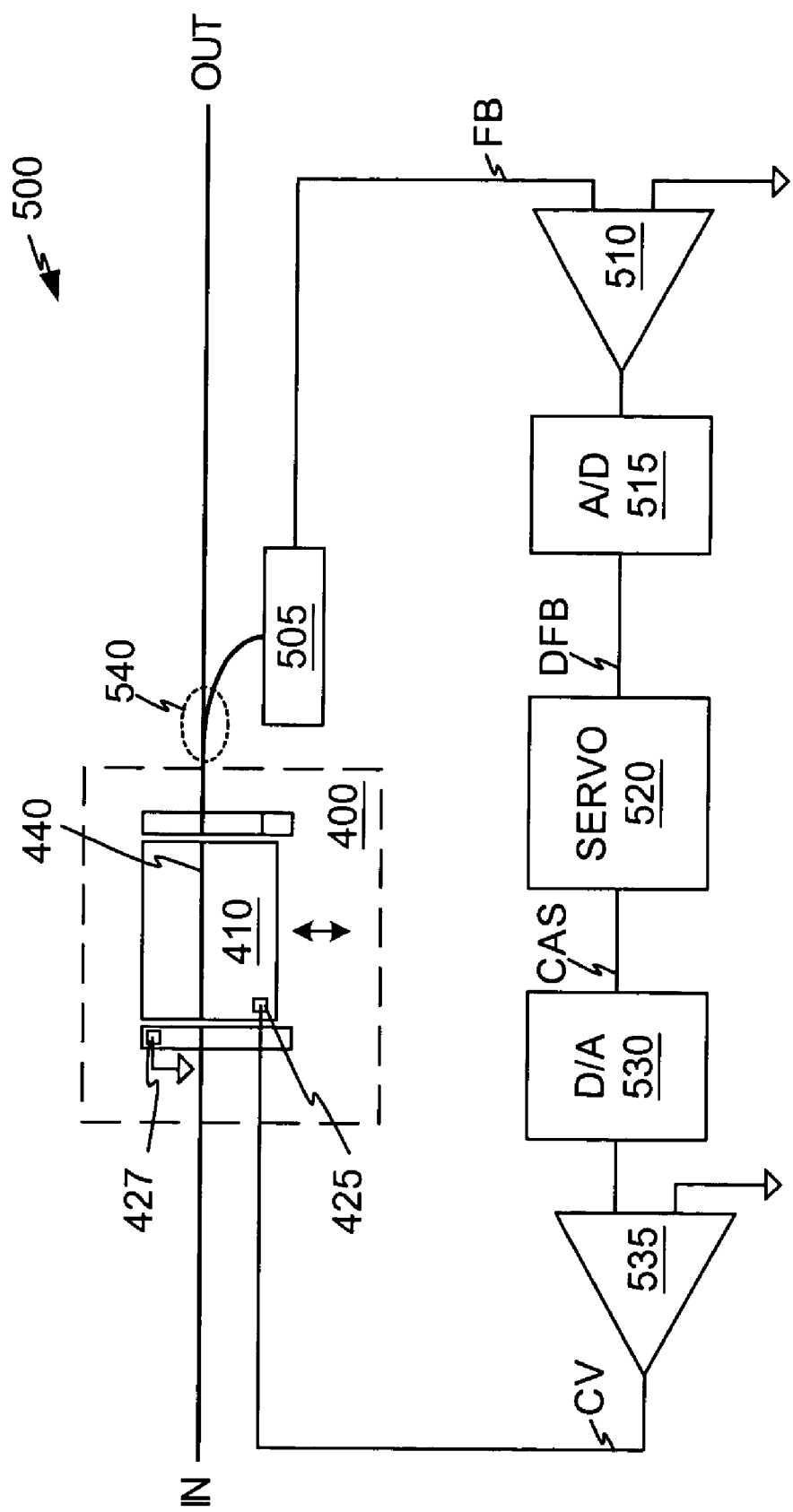
FIG. 5 depicts a VOA system 500 incorporating VOA 400 of FIG. 4.

FIG. 5 depicts an optical power equalizer system 500 incorporating VOA 400 of FIG. 4. Equalizer system 500 includes a feedback circuit that controls VOA 400 to maintain a constant light intensity in an output waveguide OUT despite variations in the light intensity of an input signal IN conveyed along a like-named input waveguide. The feedback circuit includes a conventional power detector 505 that produces a feedback signal (FB) proportional to the light intensity in waveguide OUT. An operational amplifier 510 amplifies feedback signal FB and provides the result to an analog-to-digital (A/D) converter 515 to produce a digital feedback signal (DFB). A servo circuit 520 interprets digital feedback signal DFB to produce a corrective-attenuation signal (CAS) to a digital-to-analog (D/A) converter 530. The resulting analog CAS signal is amplified by a second operational amplifier 535 to provide an analog control signal (CV) (a control voltage in this example) to pad 425 of VOA 400.

Servo circuit 520 increases corrective attenuation signal CAS in response to increases in the magnitude of feedback signal DFB. The feedback circuit consequently increases the magnitude of control voltage CV in response to increases in output light intensity. Increases in the magnitude of control voltage CV increase the level of misalignment between waveguide segments, and so reduce the output intensity in waveguide OUT. Reductions in light intensity produce the opposite effect by reducing the extent of waveguide misalignment. DFB System 500 therefore maintains a stable output signal despite intensity fluctuations in input waveguide IN.

Power detector 505 receives a small percentage of the light passing through an output waveguide (e.g., an optical fiber). To accomplish this, an optical splitter 540 is formed or engaged to the output waveguide to split a fraction of, e.g., a few percent, of the output beam to produce a monitor beam. The optical splitter may be implemented in various configurations. For example, a portion of a fiber waveguide may be side-polished to remove a portion of the fiber cladding to form an optical port. Optical energy from the port can then be evanescently coupled out of the output waveguide to produce the monitor beam. In another example, an angled fiber Bragg grating may be fabricated in the waveguide so that a small fraction of light is reflected in the direction normal to the optical axis of fiber to produce the monitor beam. In yet another example, conventional fiber beam splitter or tap can be used.

Figure 6A:
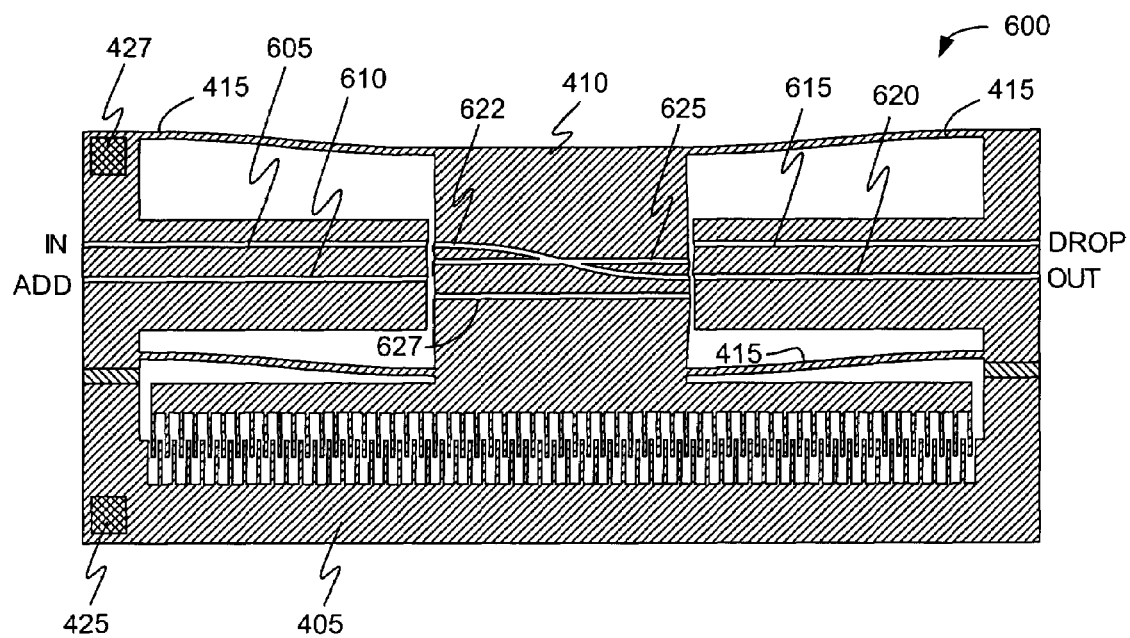
FIGS. 6A and 6B depict an add/drop switch 600 that also functions as a variable optical attenuator.

FIG. 6A depicts an add/drop switch 600 that, in accordance with one embodiment, doubles as an optical power equalizer. Switch 600 is similar to VOA 400 of FIGS. 4A and 4B, like-numbered elements being the same or similar. Switch 600 combines variable-optical attenuation with optical switching. Combining switching with attenuation advantageously reduces the expense and complexity of components required to build a number of optical systems.

Switch 600 includes a first pair of fixed waveguide segments 605 and 610 receiving respective input and add signals IN and ADD, a second pair of fixed waveguide segments 615 and 620 conveying respective drop and out signal DROP and OUT, and three movable waveguide segments 622, 625, and 627 extending between the fixed waveguide pairs.

Figure 6B:
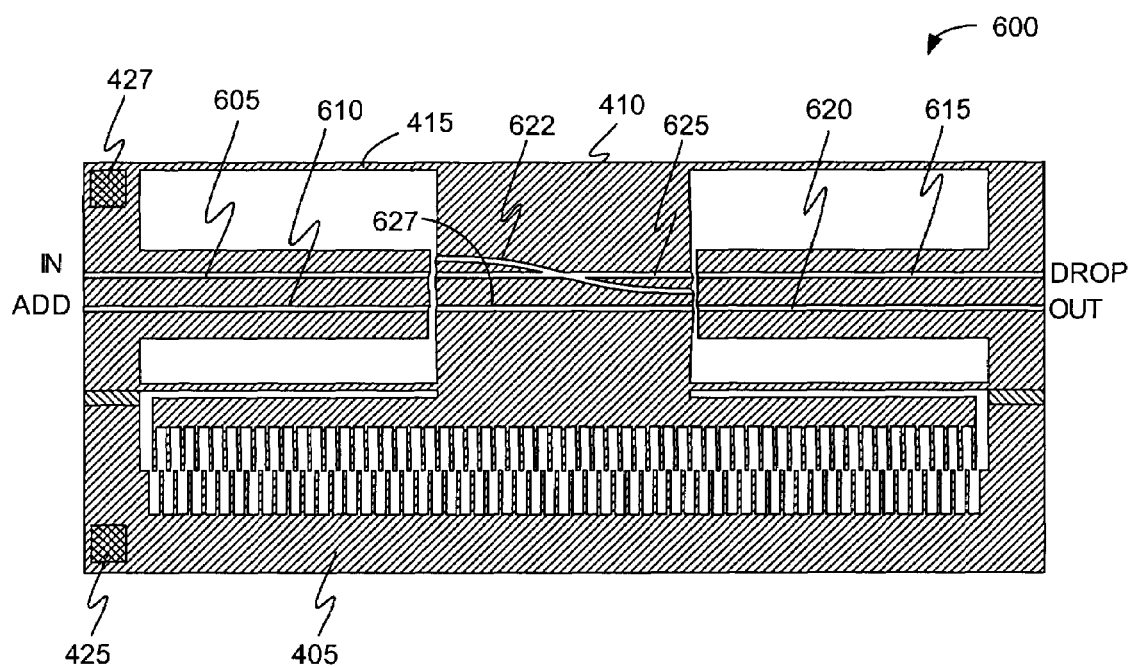

A particular applied voltage between pads 425 and 427 flexes springs 415 in the manner depicted in FIG. 6A so segment 622 optically couples segments 605 and 620, passing input signal IN to output port OUT. In the absence of an applied voltage, springs 415 align waveguide segments 625 and 627 as depicted in FIG. 6B. In this condition, switch 600 conveys input signal IN to output DROP and add signal ADD to output OUT. In another embodiment, the waveguide segments in movable portion 410 are configured to convey input signal IN to output OUT in the absence of an applied voltage.

Figure 7A:
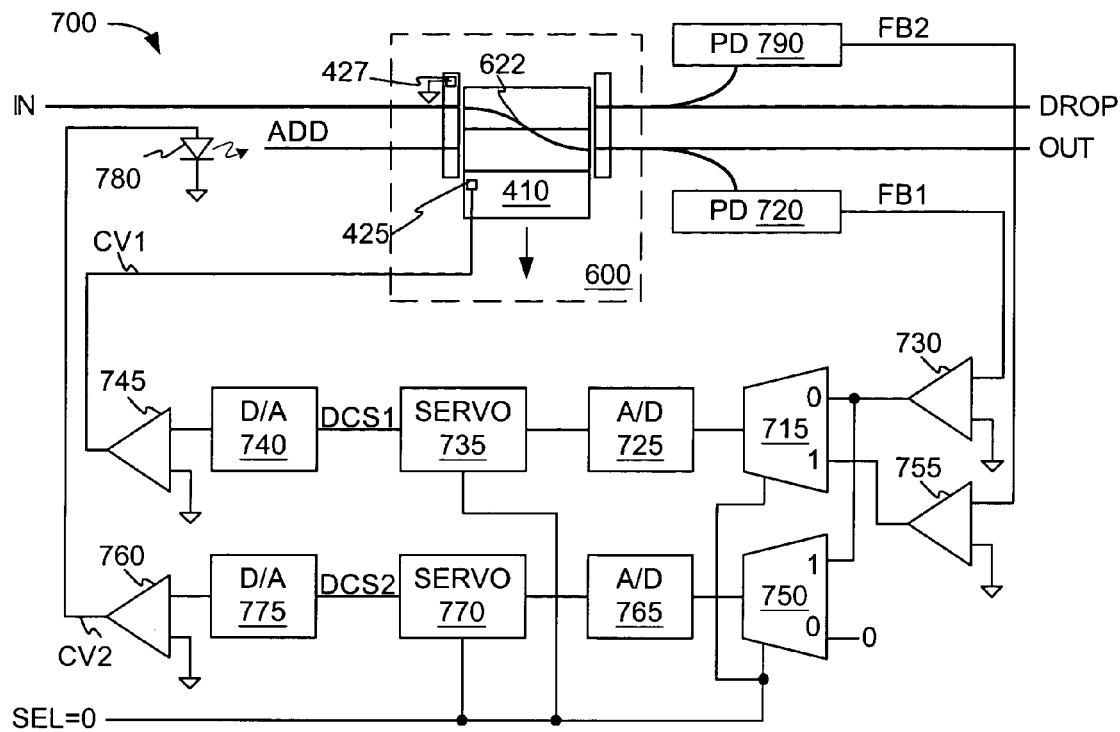
FIG. 7A illustrates an add/drop system 700 that includes switch 600 in the switch position of FIG. 6A (IN to OUT)
Figure 7B:
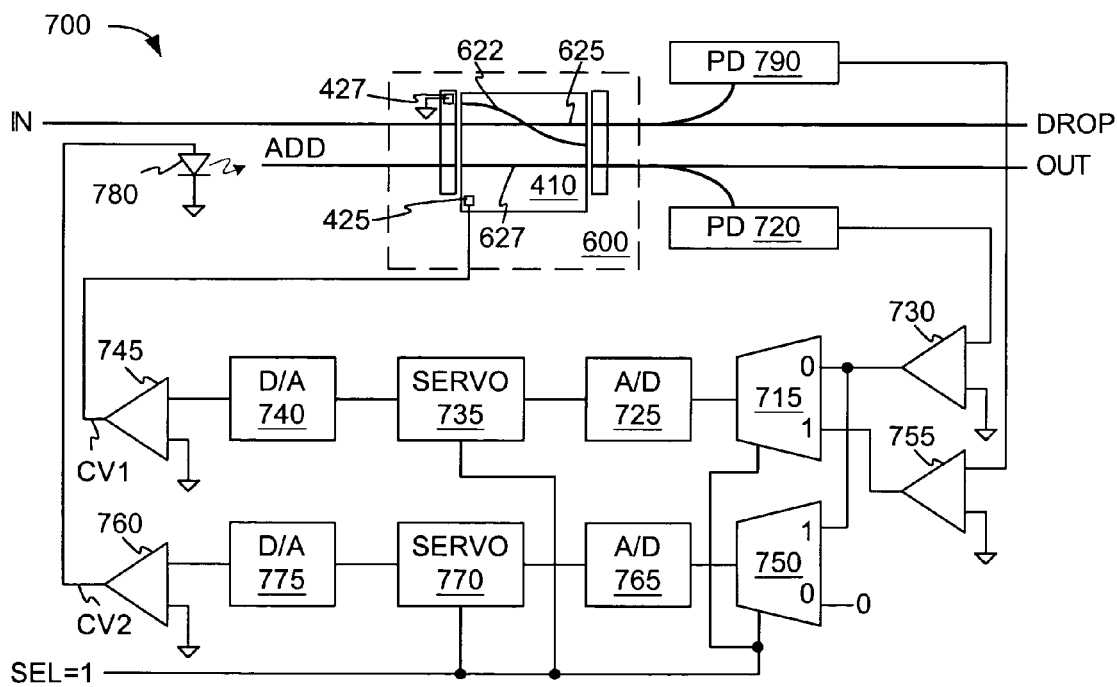
FIG. 7B depicts add/drop system 700 wherein switch 600 is in the switch position of FIG. 6B (IN to DROP; ADD to OUT).

FIG. 7A depicts an add/drop system 700 that includes switch 600 in the switch position of FIG. 6A (IN to OUT); FIG. 7B depicts add/drop system 700 wherein switch 600 is in the switch position of FIG. 6B (IN to DROP; ADD to OUT). System 700 includes two feedback paths to control the intensities of two signals DROP and OUT in corresponding waveguides.

In the configuration of FIG. 7A, system 700 merely passes input signal IN to output OUT. In that case, select signal SEL is a logic zero, so multiplexer 715 conveys a feedback signal FB1 from power detector 720, amplified by a transimpedance amplifier 730, to analog to A/D converter 725. The digital feedback signal to the servo electronics 735 is offset by an appropriate amount, and the resulting digital signal is fed to pad 425 via digital-to-analog (D/A) converter 740 and operational amplifier 745 as a control voltage CV1. In this switch state, servo 735 controls the alignment of waveguide segment 622 with respect to the input and output waveguides to provide a steady output signal OUT.

A second feedback path powers a laser diode 780. This feedback path includes a multiplexer 750, an A/D converter 765, servo electronics 770, and a D/A converter 775. Although not shown, conventional modulation circuitry associated with laser diode 780 can introduce a modulated signal on an input optical waveguide ADD.

Both feedback paths come into play in a second switch state, e.g. when signal SEL is set to a logic one. Referring to FIG. 7B, waveguide segment 625 directs input signal IN to output waveguide DROP, and waveguide segment 627 directs add signal ADD from laser diode 780 to output waveguide OUT. The first feedback path employs feedback signal FB2 to align waveguide segment 625 as necessary to provide a relatively stable intensity on output DROP. The second feedback path employs feedback signal FB1 to control the intensity of input signal ADD, and consequently the intensity of output signal OUT.

Any misalignment imposed on waveguide segment 625 to attenuate input signal IN similarly attenuates input signal ADD. The second feedback loop, which includes multiplexer switch 750 and servo 770, modulates the power—and consequently the intensity—of laser diode 780 as necessary to provide a desirable intensity on output waveguide OUT. Thus, increasing the intensity of laser diode 780 compensates for any attenuation imposed by a misalignment between the moving and stationary portions of optical switch 600. The two feedback paths thus maintain relatively constant DROP and OUT output signals despite intensity variations on either or both of input signals IN and ADD.

In other embodiments, waveguide segment 627 can be physically actuated separately from segments 622 and 625 to afford independent control of the ADD and DROP signals. In still other embodiments, waveguide segments 610 and 627 can be gradually tapered toward their respective emitting facets to reduce or eliminate the ADD->OUT alignment sensitivity. In an embodiment in which the waveguide segments are roughly six micrometers square in cross section, the emitting facets of waveguide segments 610 and 627 can be tapered down to three or four micrometers in a dimension substantially parallel with the comb teeth. Such tapering will produce some light loss across the associated gaps, but moderate alignment adjustments to waveguide segment 625 will not significantly affect the output intensity of beam OUT.

Figure 8:
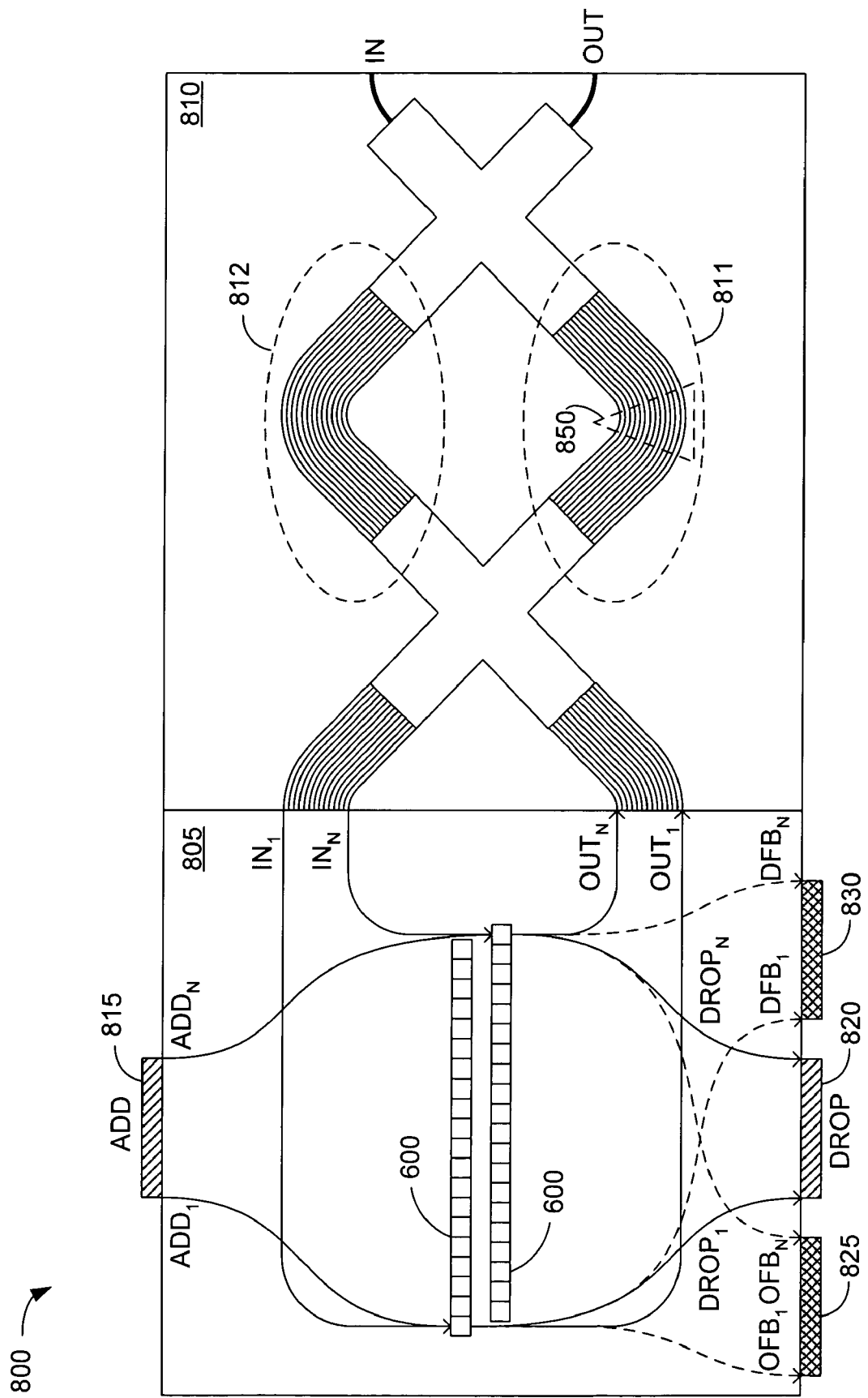
FIG. 8 is a plan view of a ROADM 800 in accordance with one embodiment.

FIG. 8 is a plan view of a ROADM 800 in accordance with one embodiment. ROADM 800 includes an optical switch matrix 805 and a waveguide grating router WGR 810. Switch matrix 805 and WGR 810 can be formed separately and bonded together or can be formed monolithically.

WGR 810 demultiplexes a multi-wavelength input signal IN into its constituent spectral components $IN_1$ through $IN_N$ (only two of which are shown), which are conveyed into switch matrix 805 on like-named waveguides. Waveguides $IN_1$–$IN_N$ then convey these signals to respective ones of a plurality of switches 600 of the type described above in connection with FIGS. 6A, 6B, 7A, and 7B. The majority of the waveguides are omitted for clarity.

A fiber bundle 815 abuts an edge of matrix 805 to provide N add signals ADD to switches 600 via respective add waveguides $ADD_1$–$ADD_N$ (the number N may be e.g. between 40 and 80). A second fiber bundle 820 abuts another edge of matrix 805 to receive N drop signals DROP from optical switches 600 via respective drop waveguides $DROP_1$–$DROP_N$. A pair of power-detector arrays 825 and 830 also abuts matrix 805, tapping off a portion of each output signal and drop signal to provide the requisite feedback for attenuation and equalization. Control electronics associated with each switch 600, as described in connection with FIGS. 7A and 7B, respond to N select signals to add/drop optical channels.

Detector array 825 receives out-feedback signals $OFB_{1-N}$, which are tapped off output waveguides $OUT_{1-N}$, and detector array 830 receives drop-feedback signals $DFB_{1-N}$, which are tapped off drop waveguides $DROP_{1-N}$. Detector arrays 825 and 830 control the output intensities of the DROP and OUT signals so that ROADM 800 combines switching and equalization. Passing and added channels exit switching matrix 805 on waveguides $OUT_1$–$OUT_N$ and enter into multiplexer 812, which directs all channels into one or more optical waveguides (e.g., integrated waveguides or optical fibers). Multiplexer 812 and demultiplexer 811 can overlap each other as illustrated in FIG. 8 or they can be adjacent to each other. Multiplexer 812 and demultiplexer 811 can be fabricated monolithically on the same chip or can reside on separate chips depending on yield and fabrication control of two sets of waveguides.

Multiplexer 812 and demultiplexer 811 are complex structures that are sensitive to process variations. Unfortunately, such variations often produce waveguide gratings in which the wavelengths are conveyed at positions slightly offset from the design wavelengths. There is therefore a need for some degree of post-fabrication trimming of the filter response to match the wavelengths with corresponding input and output waveguides $IN_{1-N}$ and $OUT_{1-N}$, respectively. For a discussion of some forms of post-fabrication trimming, see e.g. U.S. Pat. No. 6,580,863 to Yegnanarayanan, et al., entitled "System and Method for Providing Integrated Optical Waveguide Device," which is incorporated herein by reference.

The wavelength passed by a given waveguide within a waveguide grating is a product of the waveguide length and the refractive index n over that length. Individual waveguides can therefore be tuned by altering the refractive index n over a specified portion of the waveguide. Fortunately, for reasons that will become clear below, there is often a relationship between the degrees to which waveguides in a given grating differ from their ideal wavelengths, and this relationship can be determined by analyzing the spectral response of the grating.

Exposing a given waveguide to sufficient energy with appropriate wavelengths and pulse durations can alter the refractive index n of the waveguide. Because the wavelength selected by a given waveguide in a fiber grating depend on their lengths and refractive indices, individual waveguides can be tuned by exposing appropriate lengths of the individual waveguide to high-power light, such as ultraviolet light from and Excimer laser or femtosecond pulsed Ti sapphire laser.

FIG. 8 depicts an example of mask shape 850. To illustrate the concept of trimming, it is assumed that the spectral content of light passed through demultiplexer 811 indicates that the various wavelengths are all shifted, and that the shift increases from the wavelength to input $IN_1$ to the wavelength on input INN. In that case, a similar power (e.g., similar exposure time at the same light intensity) can be applied to varying lengths of the input waveguides, with those waveguides most in need of tuning having the longest exposed segments. In the example, a triangular mask 850 exposes a greater length of the other waveguides than the inner waveguides. The shape of mask 850 can easily be altered to account for different wavelength errors.

In embodiments in which WGR 810 and switch matrix 805 are formed monolithically, the spectral content of demultiplexer 811 is measured via the drop outputs DROP and tuned accordingly. Switches 600 can then convey the calibrated input signals to multiplexer 812 so that multiplexer 812 can be similarly calibrated.

Figure 9A:
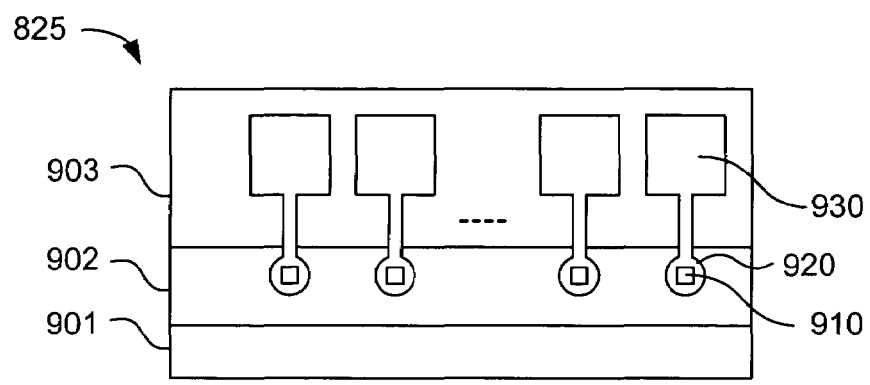
FIG. 9A is a plan view of an optical power detector array 825 integrated with optical waveguides.

FIGS. 9A, B, and C depict one embodiment of power detector array 825 of FIG. 8; array 830 is similar, and is omitted here for brevity. FIG. 9A depicts array 825 from a side that abuts waveguides $OFB_{1-N}$ to receive corresponding optical feedback channels. Array 825 includes a substrate 901, cladding 902, and waveguide cores 910. Each core 920 abuts a corresponding waveguide $OFB_{1-N}$ of ROADM 800 of FIG. 8. A device 903 contains an array of optical power monitors 920, such as InGaAs PIN diodes.

Figure 9B:
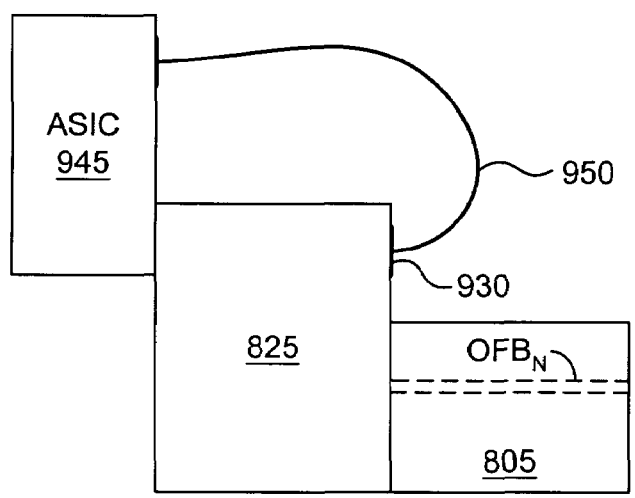
FIG. 9B illustrates a first side view of detector array 825 of FIG. 9A.

FIG. 9B depicts power-detector array 900 positioned against switch matrix 805 such that waveguide cores 910 abut corresponding feedback waveguides $OFB_{1-N}$. Electrical pads 930 connect to photodetectors 920 to an Application Specific Integrated Circuits (ASIC) 945 via leads 950. ASIC 945 includes a set of transimpedance amplifiers like amplifiers 730 and 755 of FIG. 7A. In other embodiments, the amplifiers of ASIC 945 reside on the same chip as the photodetectors.

Figure 9C:
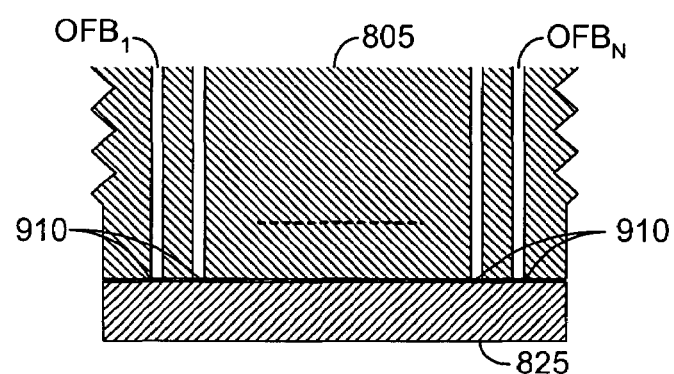
FIG. 9C illustrates a second side view of detector array 825 of FIG. 9A.

FIG. 9C is a top view of power detectors 825 that are aligned with respect to switch matrix 805 so that waveguides 910 abut waveguides $OFB_{1-N}$.

Figure 1:
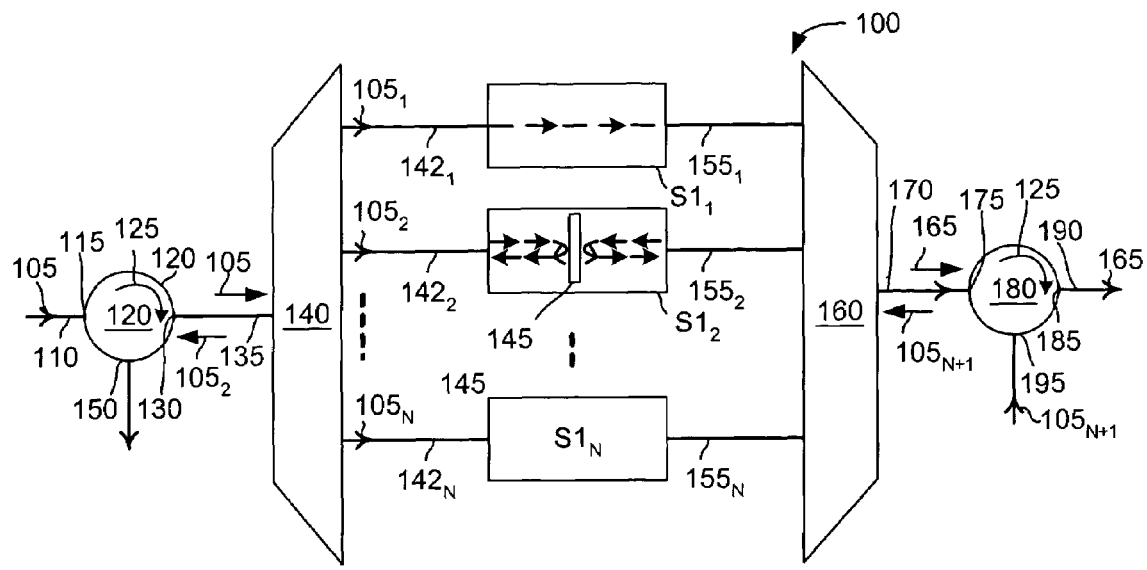
FIG. 1 (prior art) depicts a conventional ROADM 100, based on N 1×1 switches, suitable for processing WDM signal 105 having N channels.
Figure 2:
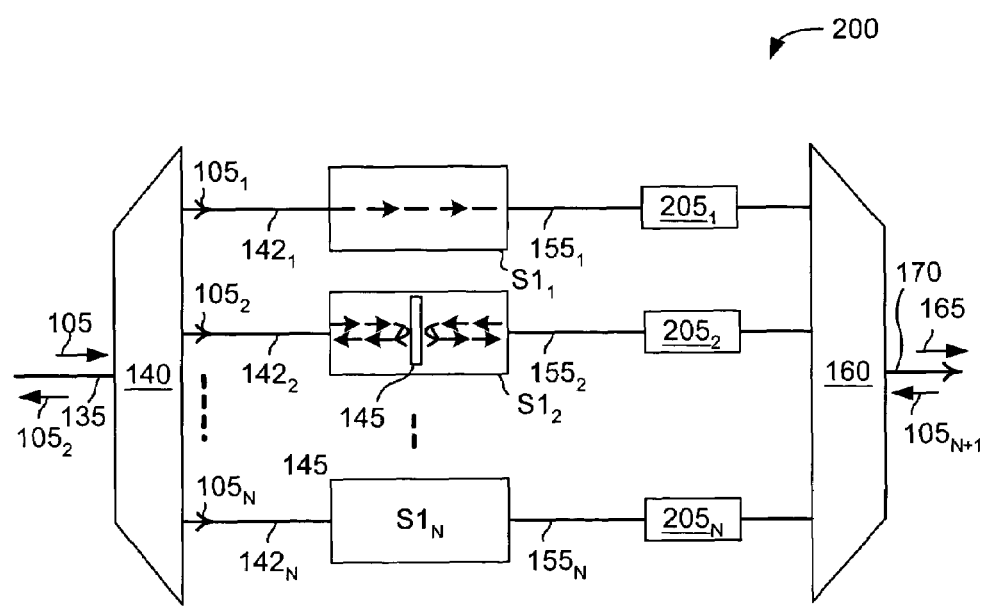
FIG. 2 (prior art) depicts a conventional ROADM 200 similar to ROADM 100 of FIG. 1 but with light intensity equalization, like-labeled elements being the same.
Figure 3:
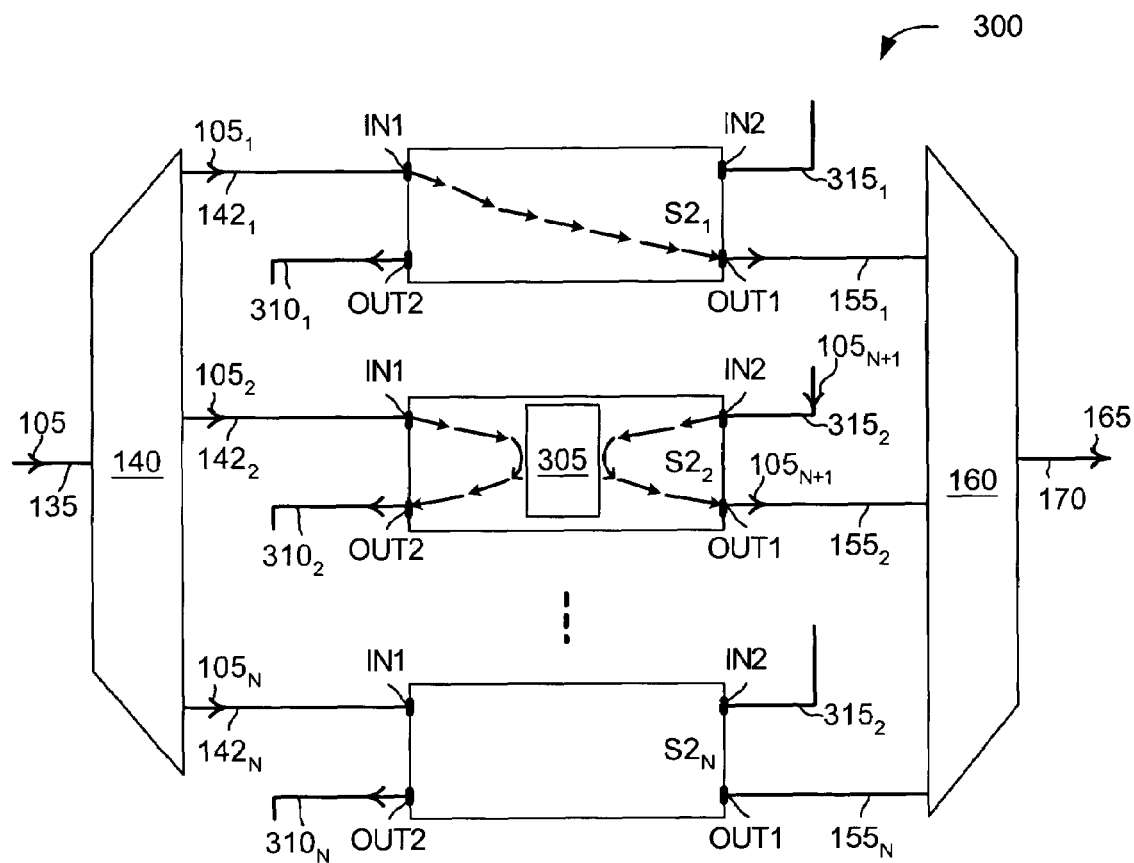
FIG. 3 (prior art) depicts a second conventional ROADM 300 in which N 2×2 switches $S2_1$–$S2_N$ replace the 1×1 switches of ROADM 100.
Figure 10:
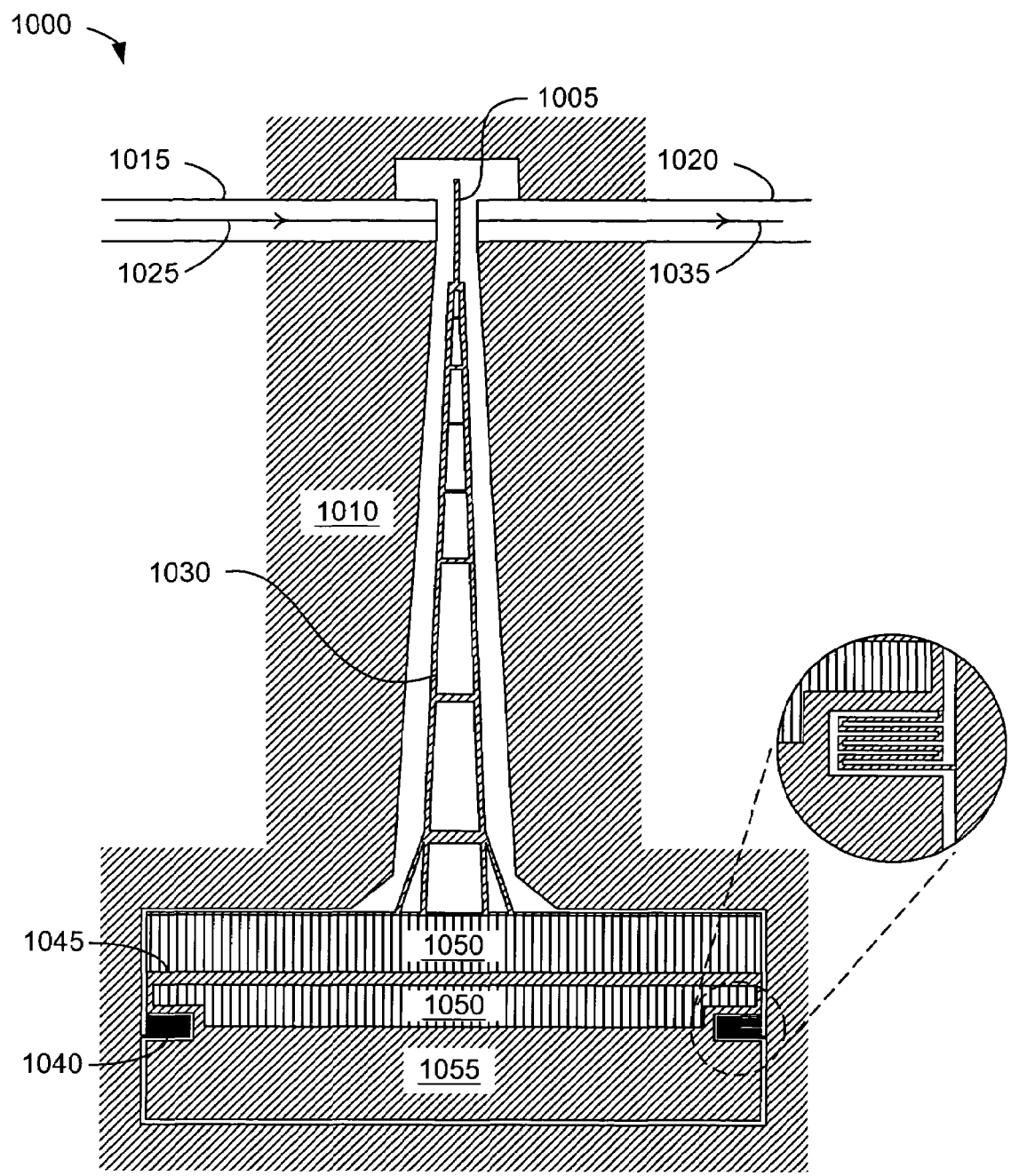
FIG. 10 depicts an electrostatic, rotational comb actuator 1000 in accordance with another embodiment.

FIG. 10 depicts an electrostatic, rotational comb actuator 1000 in accordance with another embodiment. Actuator 1000 can be used, for example, in a system of the type described above in connection with FIGS. 1 and 2, either as a 1×2 switch or a VOA. Actuator 1000 utilizes fibers or optical planar waveguides to guide optical signals. The switching is achieved by forming an air gap in the fiber or waveguide and by using an actuator-driven blade 1005 in the air gap to intercept the optical path in the air gap by optical reflection. Fiber or waveguide facets are spaced very short distances from the blade to allow for efficient, free-space optical coupling from and back into the fiber or waveguide without collimating optics between the fiber and the blade. Some embodiments of actuator 1000 are described in U.S. patent application Ser. No. 10/010,786, which is incorporated herein by reference.

Actuator 1000 may be fabricated with grooves for holding and self-aligning fibers, or the waveguides can be integrated with the actuator on a suitable substrate (e.g., a semiconductor substrate). The control mechanism for actuator 1000, including control electronic circuits, may be either integrated on the same substrate or located off the chip on a separate substrate. The input and output waveguides may be structured so that the numerical aperture of the output facet of the input waveguide substantially matches that of the input facet of the output waveguide. The gap between the two end facets is set to be sufficiently small so that the optical coupling from the input waveguide to the output waveguide is a direct free space coupling through the air gap and the loss of optical power is very small in absence of the blade or during back reflection. For example, the optical loss in the direct coupling of single mode fibers is about 0.5 dB and 1 dB for gaps of 30 and 50 microns respectively. In general, the optical loss decreases with the gap and vice versa. Since the gap should be large enough to accommodate free motion of the blade in the gap, the size of the gap may be limited to a range of approximately between 10 and 100 microns, and preferably between about 10 and 30 microns in many designs of the blade.

The actuator, which is engaged to the micro blade to control the position of the micro blade, may be micromachined as a MEMS component and as an integral part of the substrate to precisely control the position and movement of the blade, thereby providing variable optical attenuation. The blade may have a thickness of e.g. several microns to tens of microns and should move freely in the small gap between the waveguides or fibers. The blade has a reflective surface to reflect the light by optical reflection or to transmit the light when the blade is out of the optical path.

In one implementation, a switch based on the above design may be fabricated and integrated on a silicon substrate. The micro blade and the actuator may be formed from micro mechanical structures fabricated on the substrate. The optical detector and the actuator control circuit may also be directly fabricated on or engaged to the substrate.

In the example of FIG. 10, switch 1000 is formed on a silicon substrate 1010 in an integrated package that contains an actuator with microblade 1005 and two fiber waveguides 1015 and 1020. The gap between fibers 1015 and 1020 is small so that the spatial spread of the beam 1025 from the fiber 1015 due to the beam divergence at the output fiber 1020 is very small and the associated optical loss is small, e.g., less than 0.5 dB. Blade 1005 is engaged to an actuator arm 1030 and positioned to move in the gap in a controlled manner. Blade 1005 may be formed from the substrate material (e.g., Si), and may be coated with a reflective layer of e.g. gold. Most of input beam 1025 is coupled through the gap into output fiber 1020 as an output beam 1035 when blade 1005 is in the non-blocking (transmitting) position. Optionally, when light beam 1025 is supposed to be passed through, blade 1005 is in the blocking (reflecting) position.

Arm 1030 connects to an exemplary electrostatic rotational comb actuator, including a stationary part with combs (not shown) and a movable part with hinges 1040, a connecting bar 1045 supporting two sets of movable combs 1050, and a counterweight 1055 sized to counterbalance arm 1030, blade 1005 and combs 1050. The substrate or another plate has a groove (not shown) to hold fibers 1015 and 1020 stationary relative to the stationary part of the actuator. Stationary combs extend up from substrate 1010 to interdigitate with the comb teeth of movable combs 1050. The stationary comb teeth are typically arranged in a linear array perpendicular to the fibers 1015 and 1020. The stationary and moving comb teeth are conductive and are connected to an electrical potential.

The movable part of the actuator includes beam 1030, blade 1005, movable teeth 1050, and counterbalance 1055. Movable teeth 1050 are arranged to spatially interleave with the underlying stationary teeth to form an array of capacitors between two adjacent teeth. Movable teeth 1050 are set at a common potential that is different from the potential of the stationary teeth. The potential difference between the fixed and movable teeth causes an electrostatic torque on the movable structure. Hence, the potential difference can be controlled and varied to control the rotation and therefore the position of the movable teeth 1050 and micro blade 1005.

The two resilient hinges 1040 rotatably engage the fixed and movable portions of actuator 1000. Hinges 1040 may be e.g. torsional hinges, serpentine, or bending hinges, and define the rotational axis of the movable arm 1030. However implemented, in absence of any electrostatic interaction between the stationary teeth and movable teeth 1050, the torsional forces of the springs 1040 keep the movable arm 1030 at a position at which the micro blade is outside (or inside) the gap between the fibers 1015 and 1020. In this state, the optical signal from the fiber 1015 is completely coupled into (or blocked from) fiber 1020 without substantial attenuation. When the potential difference between the stationary and movable teeth is controlled to produce an electrostatic force to pull the movable teeth 1050 towards the underlying stationary teeth, blade 1005 can intercept (or allow transmission of) beam 1025 by an amount determined by the potential difference. The relative position of blade 1005 and the waveguides with no potential applied to the actuator determines whether the actuator is in the blocking or non-blocking position with zero voltage applied. In other embodiments, blade 1005 may partially intersect the gap between fibers in the absence of applied power, relying upon selected voltage potential to establish desired blade positions.

Actuators described herein, including actuator 1000, may be formed of a range of materials, such as semiconductors and glasses. In one implementation, the top and bottom substrates may be a semiconductor material such as silicon that is doped prior to the fabrication to be electrically conductive. The doping may be either n-type or p-type. The semiconductor material may be a single-crystal material or a polycrystalline material. Alternatively, the top and bottom substrates may be formed of a non-conductive material such as a glass material but are coated with an electrically conductive layer (e.g., a metallic coating). Moreover, the top and bottom substrates may be formed of an electrically conductive material such as a metal. Counterbalance 1050 reduces the sensitivity of actuator 1000 to vibration and orientation. In FIG. 10, teeth are placed on the same side as the arm compared with rotational axis. optionally, teeth 1050 can be placed on the opposite side of rotational axis and then lighter counterbalance 1055 can be used.

Alternatively, translational actuator can be used instead of rotational actuator. Driving mechanism can be electrostatic as described here or can be electromagnetic, piezoelectric or thermal.

Figure 11:
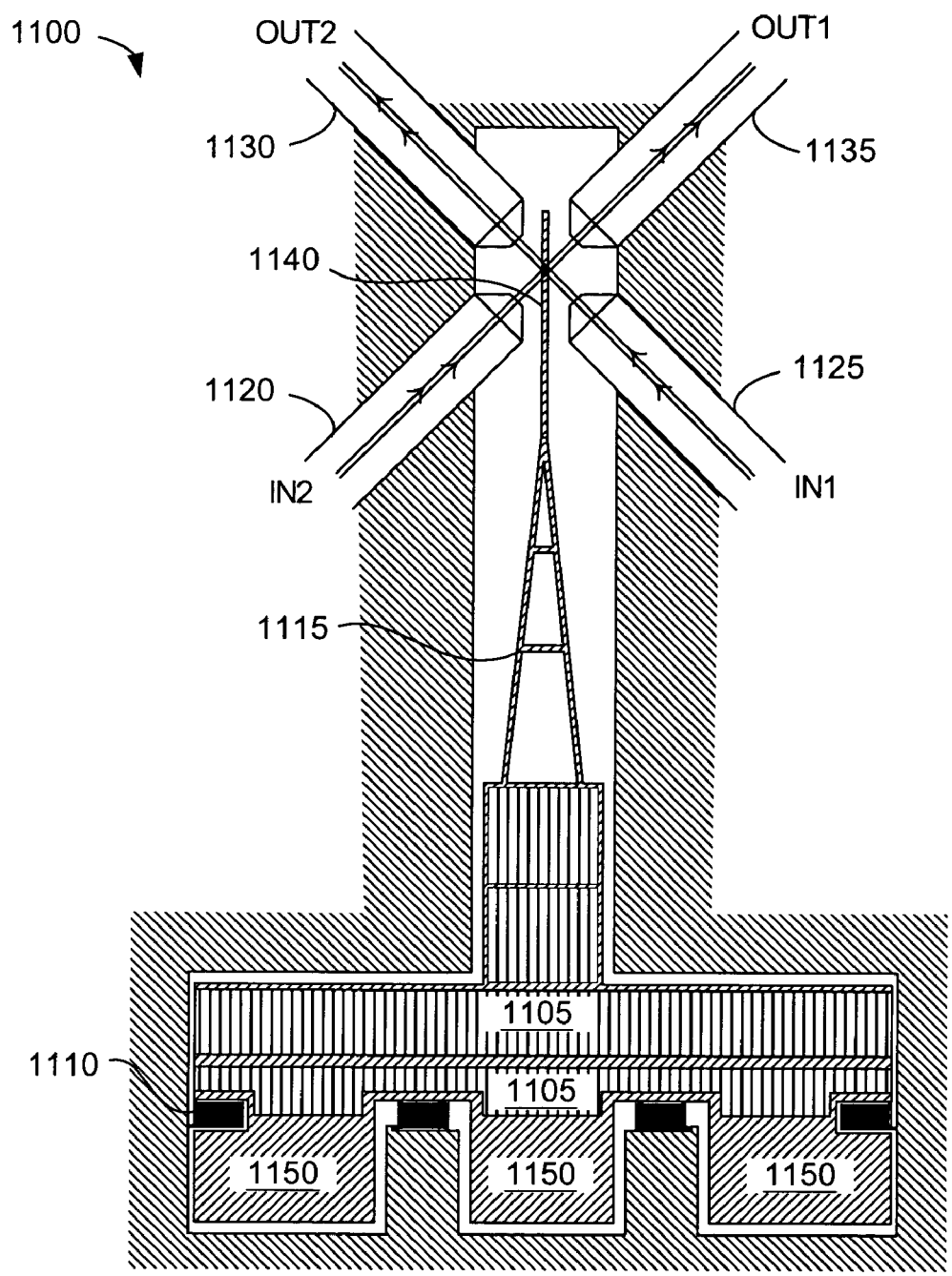
FIG. 11 depicts a 2×2 electrostatic rotational comb switch 1100 with four optical fibers/waveguides.

FIG. 11 depicts a 2×2 electrostatic rotational comb switch 1100 with four optical fibers/waveguides. Switch 1100 can employ actuators similar to those used in the 1×2 switches described above. Movable teeth 1105, hinges 1110 and an arm 1115 serve the same functions as similar components described above in connection with FIG. 10. Switch 1100 supports and separates two incoming fibers 1120 and 1125 from two outgoing fibers 1130 and 1135.

Switch 1100 can be in one of two digital states—reflecting or transmitting. When switch 1100 is in the transmitting state, light from fiber 1120 goes without interruption into outgoing fiber 1135 and light from fiber 1125 goes without interruption into outgoing fiber 1130. When switch 1100 is in the reflecting state, light from input fiber 1120 is reflected from a surface of a blade 1140 to output fiber 1130 and light from input fiber 1125 is reflected off the opposite surface of blade 1140 to output fiber 1135. In order to keep insertion losses to a minimum, separation distance between incoming and outgoing fibers should be kept to a minimum. For this reason, tapered or lensed fibers are used. Moreover, reflected beams are displaced slightly translationally with respect to transmitted beams, due to the final thickness of the actuator blade 1140. Consequently, the thickness of blade 1140 should be minimized. Only the tip of blade 1140 needs to be thinner. Over a short distance, e.g. less than 100 um, blade thickness can be kept down to 1–2 um.

Figure 12A:
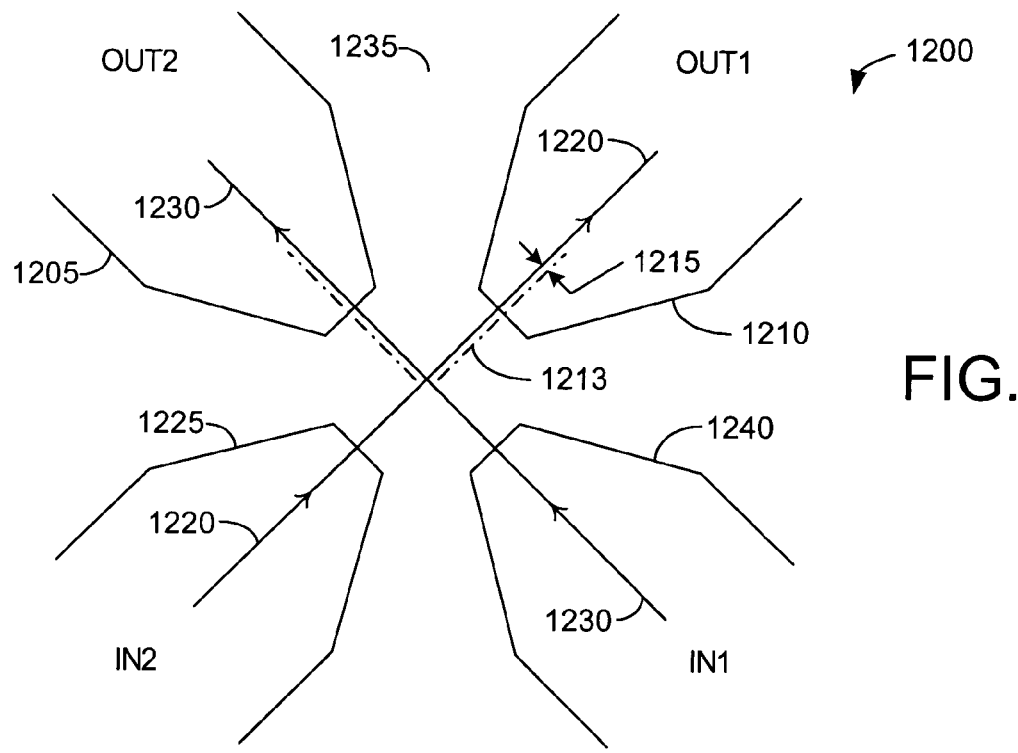
FIGS. 12A and 12B detail the beam paths of an actuator 1200 similar to actuator 1100 of FIG. 11.
Figure 12B:
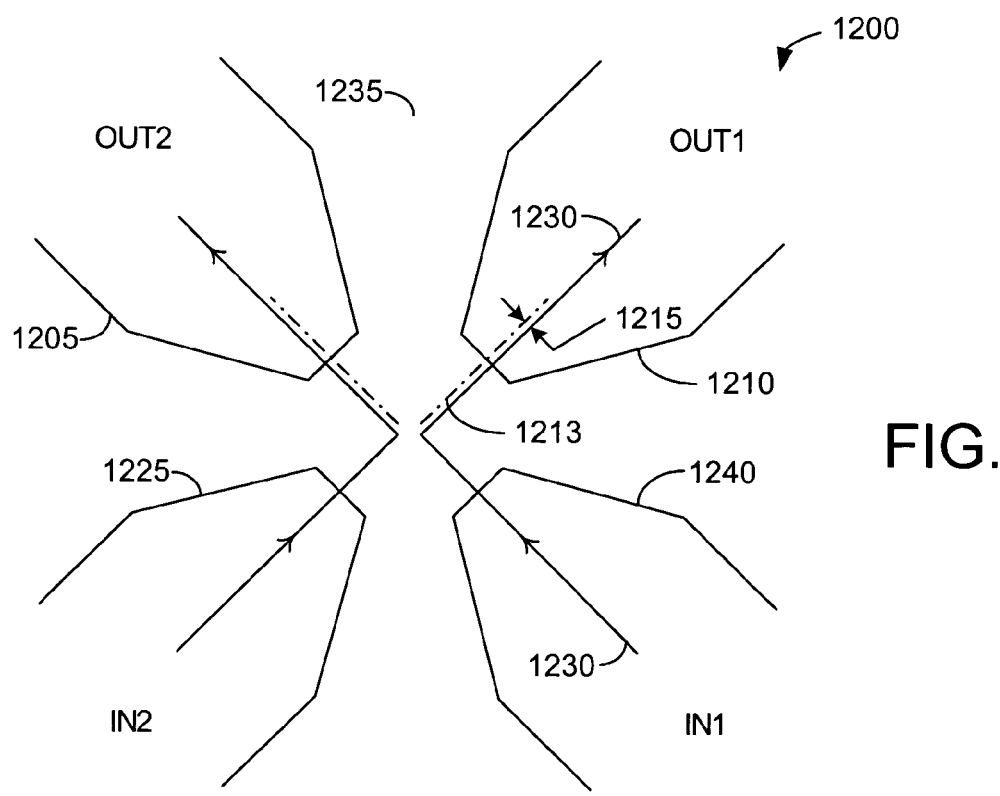

The double or multiple comb structures of these electrostatic actuators linearize deflection of actuator with applied voltage and generate damping. High stiffness shifts resonance frequencies to high values, providing considerable immunity to vibrations and shock. Small gaps between teeth and a large number of teeth generate high torque even with relatively low voltages. Counterbalances 1150 are sized so the center of gravity of the movable portion of switch 1100 extends along a fulcrum axis defined by hinges 1110. FIGS. 12A and 12B detail the beam paths of an actuator 1200 similar to actuator 1100 of FIG. 11. The outgoing waveguides 1205 and 1210 are offset with respect to transmitted beams by the distance equal to half of reflected beam displacement. In the example of FIGS. 12A and 12B, the center 1213 of exit fiber 1210 is displaced by a distance 1215 from the light beam 1220 received from fiber 1225 when actuator 1200 is in a transmissive state (i.e., a blade 1235 is positioned to allow passage of beams 1220 and 1230). Conversely, the center 1213 of fiber 1210 is displaced by the same distance 1215 in the opposite direction from the light beam 1230 received from input waveguide 1240 when actuator 1200 is in a reflective state (i.e., blade 1235 is positioned to reflect beams 1220 and 1230). The same arrangement is employed for the other set of incoming and outgoing fibers.

Figure 13A:
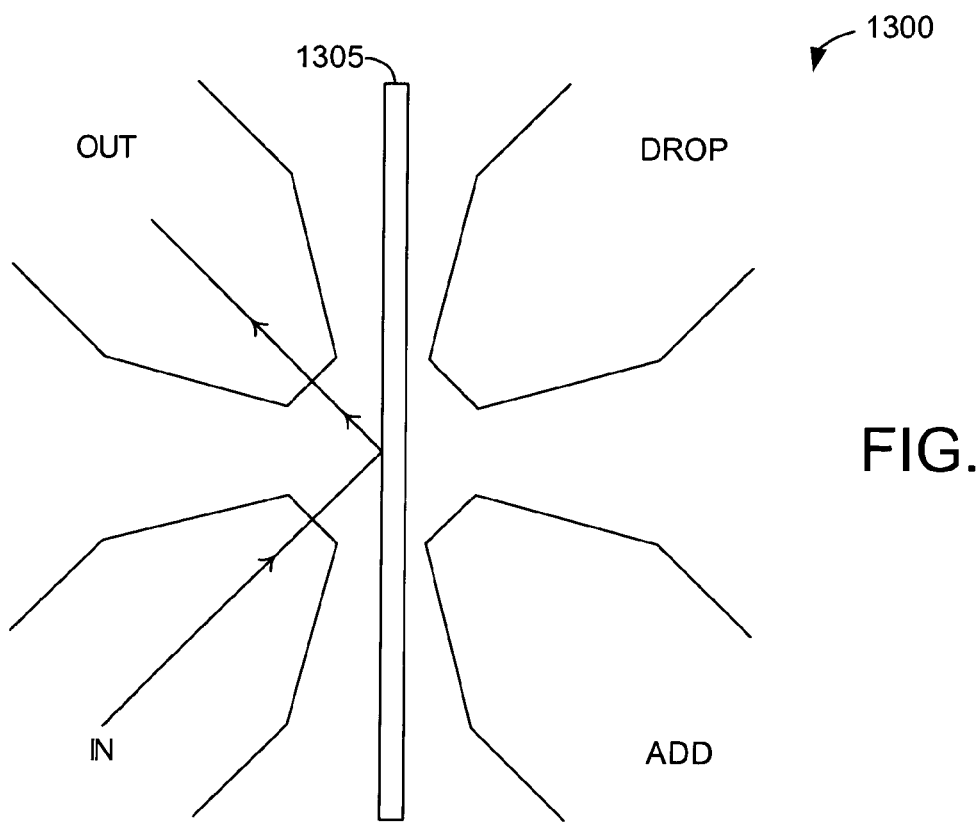
FIGS. 13A and 13B illustrate an add/drop switch 1300 in accordance with another embodiment.
Figure 13B:
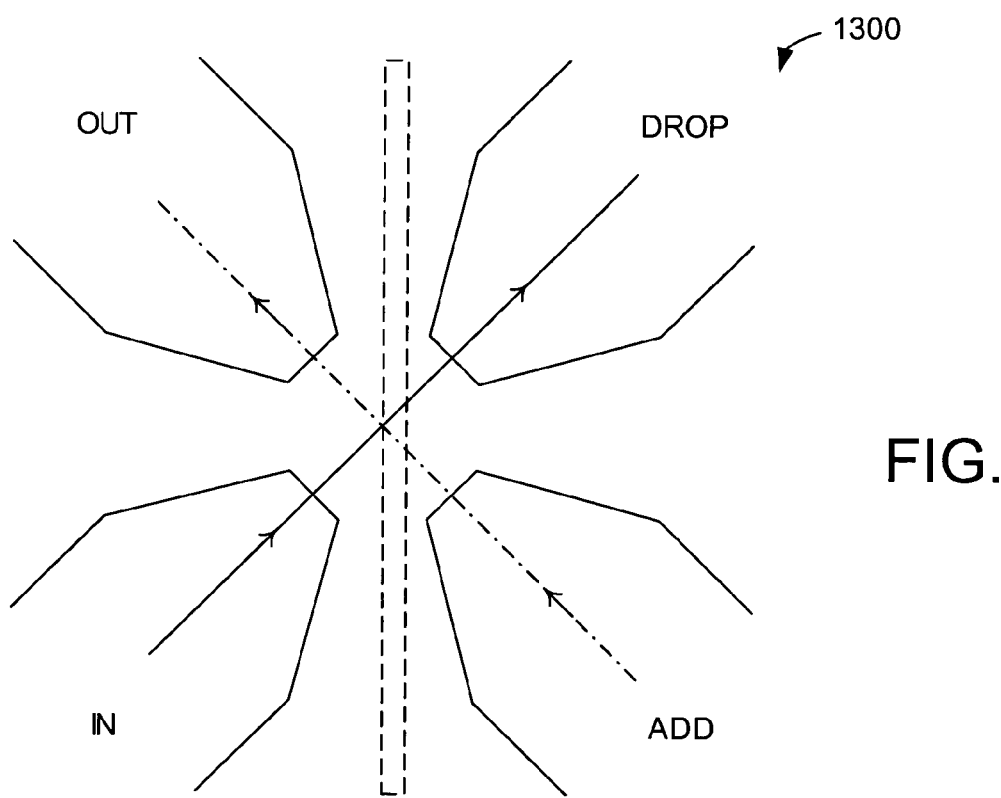

FIGS. 13A and 13B depict an add/drop switch 1300 in accordance with another embodiment. The fibers are not offset to account for the thickness of a blade 1305 because switch 1300 need not establish a signal path between the ADD and DROP fibers. Instead, blade 1305 is positioned so the reflecting surface (IN to OUT) is at the intersection of the input beam IN and add beam ADD.

Figure 14:
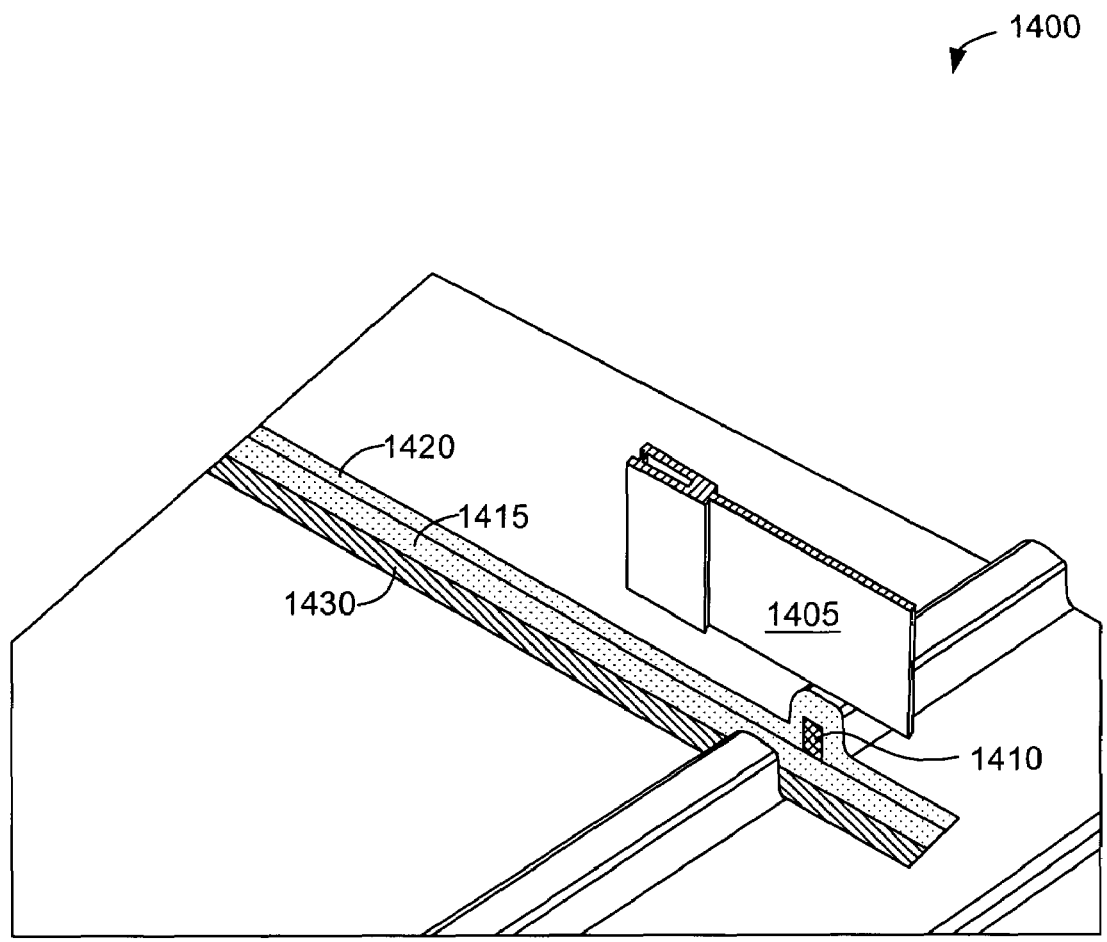
FIG. 14 depicts portions of an actuator 1400 in accordance with an embodiment that includes a blade 1405 that selectively separates opposing facets of a waveguide 1410.

FIG. 14 depicts portions of an actuator 1400 in accordance with an embodiment that includes a blade 1405 that selectively separates opposing facets of a waveguide 1410 of doped silica. Two cladding layers 1415 and 1420 of undoped silicon dioxide deposited over a conductive, doped silicon substrate 1430 surround waveguide 1410. Actuator 1400 can be fabricated using a process sequence similar to that described below in connection with FIGS. 19A–19W.

Rotational electrostatic actuators can be substituted by translational electrostatic actuators that function in a manner similar to rotational actuators. Moreover, electrostatic actuators can be substituted by electromagnetic actuators such as those described in U.S. patent application Ser. No. 10/010,786. The fabrication of these switches is similar to the fabrication outlined in the above-mentioned patent application. The notable additions are:

1. Deposition of insulator films such as silicon dioxide or silicon nitride over area surrounding the actuator blade.
2. Deposition of metal films to reflect light from incoming to outgoing fibers with minimal optical losses. Coated area is smaller than the above area covered with dielectric in order to prevent electrical shorting of components that are at different electrostatic potentials.
3. Metal adhesion such as chromium, titanium or tantalum followed by gold films to cover sidewalls of the blade tips.
4. Reactive ion etching of silicon with processing conditions that lead to very smooth sidewalls.

The above architecture of ROADM's with 1×2 or 2×2 digital switches has several significant advantages compared with conventional systems based on two-dimensional (2D) MEMS mirror arrays. Stiction does not occur with these switches, as the moving parts of the system never contact stationary parts. Insertion losses are very low and are constant from channel to channel as opposed to 2D mirror arrays with very high and variable insertion losses. Moreover, no crosstalk occurs in these switches as the individual channels are totally isolated and light beam from one channel does not cross path with light beams from the other channels in the switching array. In the case of the blade actuators, no servo is required as only two states are used—reflection and transmission states. An additional advantage of the architecture with 1×2 or 2×2 switches is the combination of DEMUX and MUX in one physical system. Light beams from DEMUX are coupled into the array of fibers and fibers are interfaced with the actuators. Reflected light beams go back through the fibers into the MUX and then to the circulator.

Actuators of the type described in connection with FIGS. 10 through 14 can be employed to equalize light intensities in different channels of a ROADM based on 1×2 switches. In that case, such switches are operated in an analog mode with functionality of variable optical attenuators. The light beams reflected from the analog switches are beam split and a small fraction of signal is directed into optical power monitors that are comprised of photodetector and transimpedance amplifier arrays.

An active closed-loop control mechanism of the type depicted in FIG. 4, for example, may be implemented to dynamically control the position of a micro blade in the foregoing embodiments to maintain the optical power in the output fiber at a desired level by monitoring the optical power in the output fiber. The power detector, sometimes called an optical detector, may be a photodiode or other photosensing device to convert the power of an optical monitor beam split from the output beam into an electrical feedback signal. A digital servo controller compares the feedback signal with a reference to generate a control signal that adjusts the blade to minimize the deviation of the measured power from the desired power.

Figure 15A:
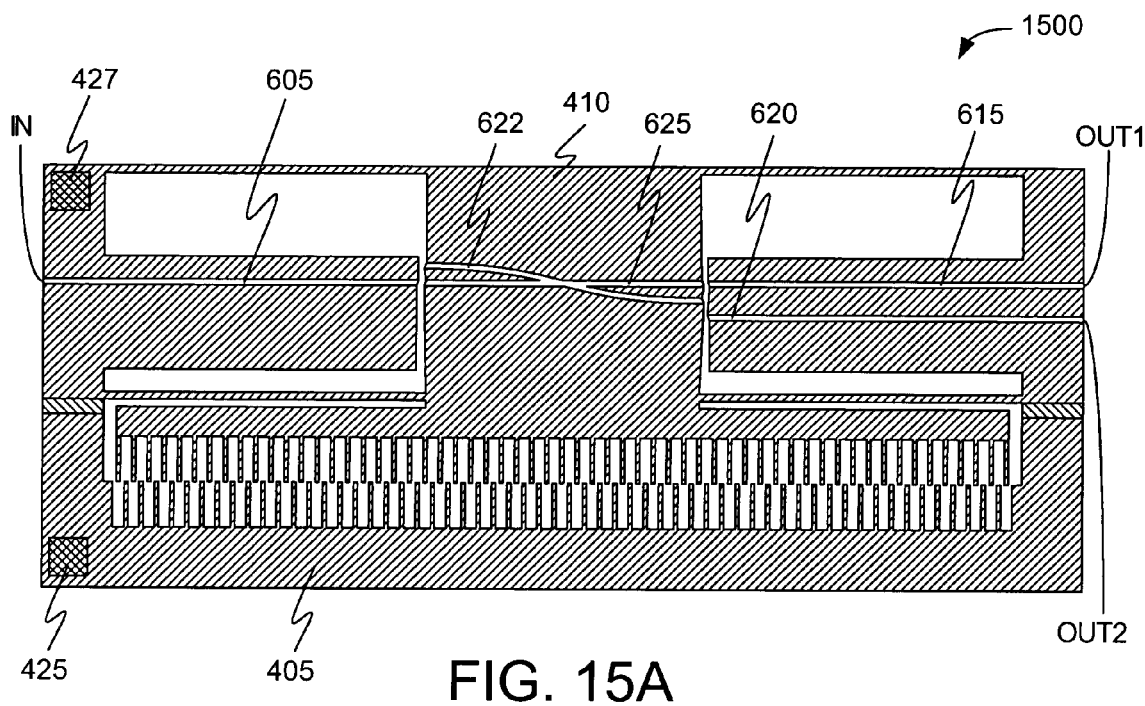
FIGS. 15A and 15B depict a MEMS 1×2 switch 1500 in accordance with another embodiment.
Figure 15B:
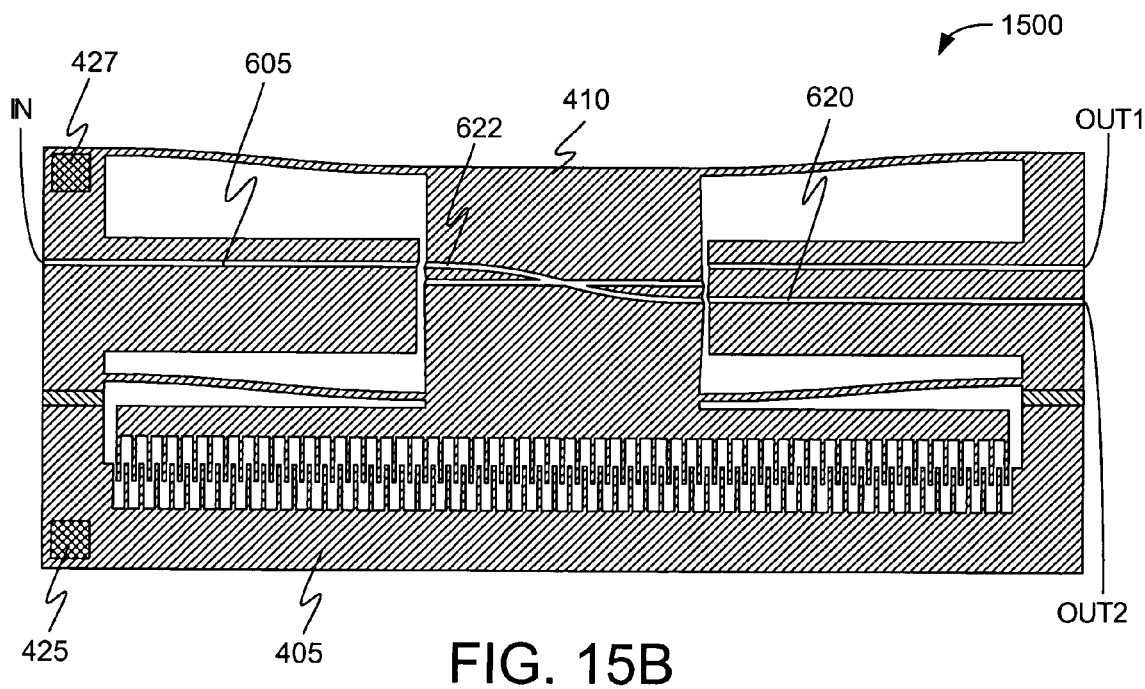

FIGS. 15A and 15B depict a MEMS switch 1500 in accordance with another embodiment. Switch 1500 is similar to switch 600 of FIGS. 6A and 6B, like-identified elements being the same or similar. Switch 1500, a 1×2 optical switch, conveys an optical input signal IN to a selected one of two outputs OUT1 and OUT2. In the switch position of FIG. 15A, waveguide segments 605, 625, and 615 are aligned to guide input signal IN to output OUT1. In the switch position of FIG. 15B, waveguide segments 605, 622, and 620 are aligned to guide input signal IN to output OUT2.

Figure 16A:
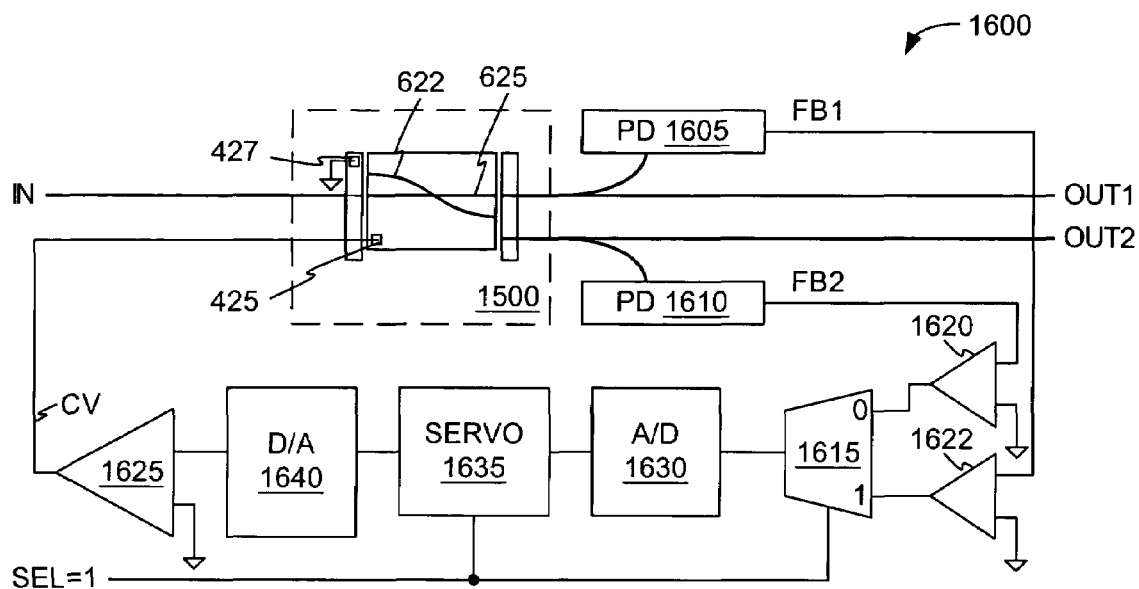
FIGS. 16A and 16B each depict a switch system 1600 in accordance with an embodiment that incorporates switch 1500 of FIGS. 15A and 15B.
Figure 16B:
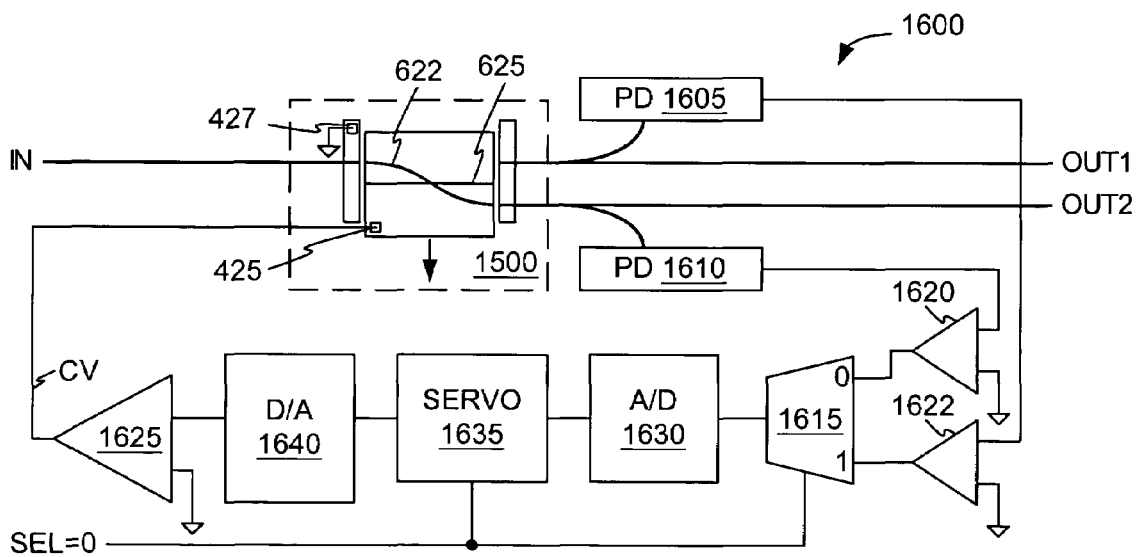

FIGS. 16A and 16B each depict a switch system 1600 in accordance with an embodiment that incorporates switch 1500 of FIGS. 15A and 15B. In the example of FIG. 16A, system 1600 conveys an optical input signal IN to a first output OUT1, whereas in FIG. 16B system 1600 conveys optical input signal IN to a second output OUT2. System 1600 advantageously combines switching functionality with variable optical attenuation.

System 1600 includes two power detectors 1605 and 1610, which provide respective feedback signals FB1 and FB2. A multiplexer 1615 provides the appropriate feedback signal to the feedback path of system 1600 based upon the selected output. A digital version of the selected feedback signal is provided to a servo circuit 1635 via an amplifier 1620 and A/D converter 1630. Servo circuit 1635 develops a digital control signal based on the select signal and the received feedback. This digital control signal defines a control voltage CV via a D/A converter 1640 and amplifier 1625.

If select signal SEL is a logic one (FIG. 16A), servo circuit 1635 establishes the appropriate control voltage CV to place switch 1500 in the position of FIG. 15A (i.e., IN to OUT1). Servo circuit 1635 then monitors feedback signal FB1 and adjusts the alignment of waveguide segment 625 as needed to maintain a constant output intensity on output OUT1. If select signal SEL is a logic zero (FIG. 16B), servo circuit 1635 establishes a different baseline voltage to place switch 1500 in the position of FIG. 15B (i.e., IN to OUT2).

Servo circuit 1635 then monitors feedback signal FB2 and adjusts the alignment of waveguide segment 622 as needed to maintain a constant output intensity on output OUT2.

Figure 17A:
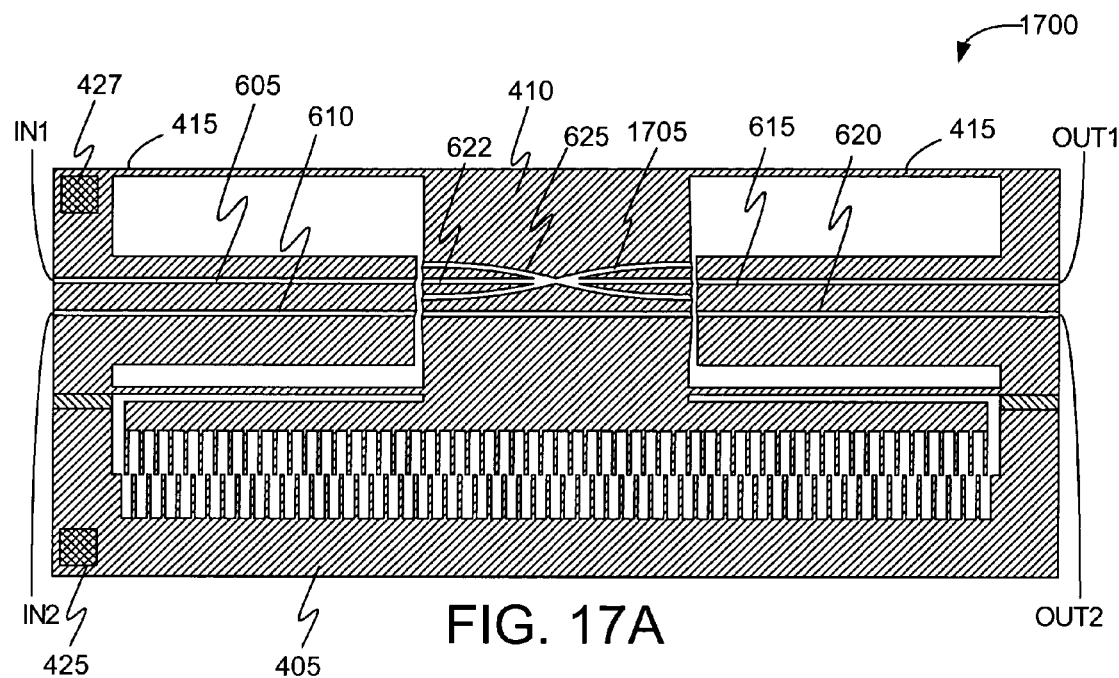
FIGS. 17A and 17B depict a 2-by-2 switch 1700 in accordance with another embodiment.
Figure 17B:
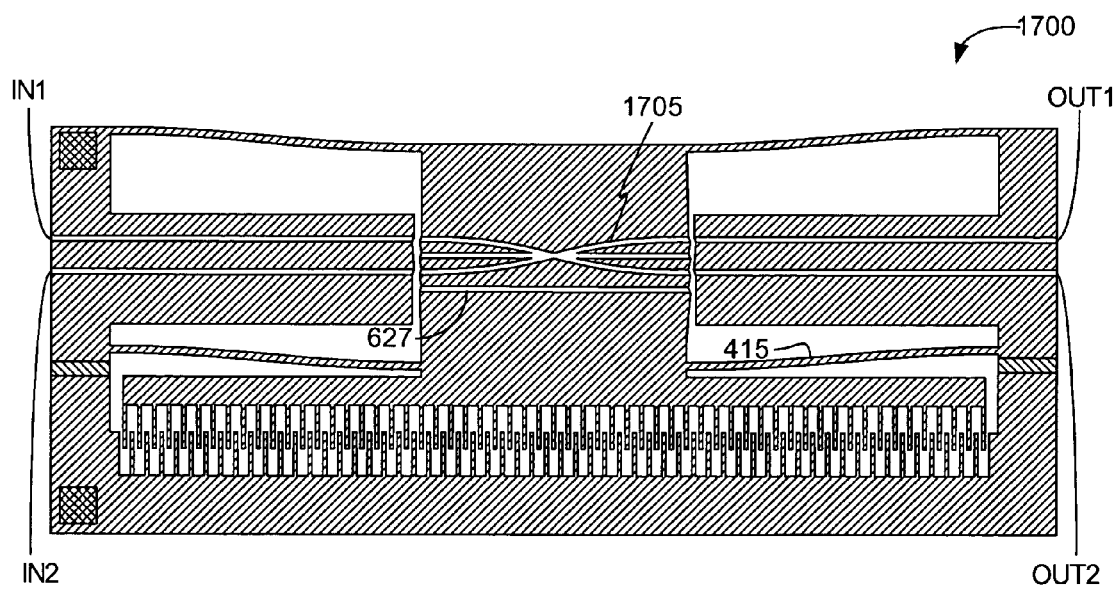

FIGS. 17A and 17B depict a 2×2 switch 1700 in accordance with another embodiment. Switch 1700 is similar to switch 600 of FIGS. 6A and 6B, like-labeled elements being the same or similar, but includes an additional waveguide segment 1705. Switch 1700 can direct signals IN1 and IN2 to respective outputs OUT1 and OUT2 (FIG. 17A), or can cross connect the inputs and outputs in the manner shown in FIG. 17B.

Figure 18A:
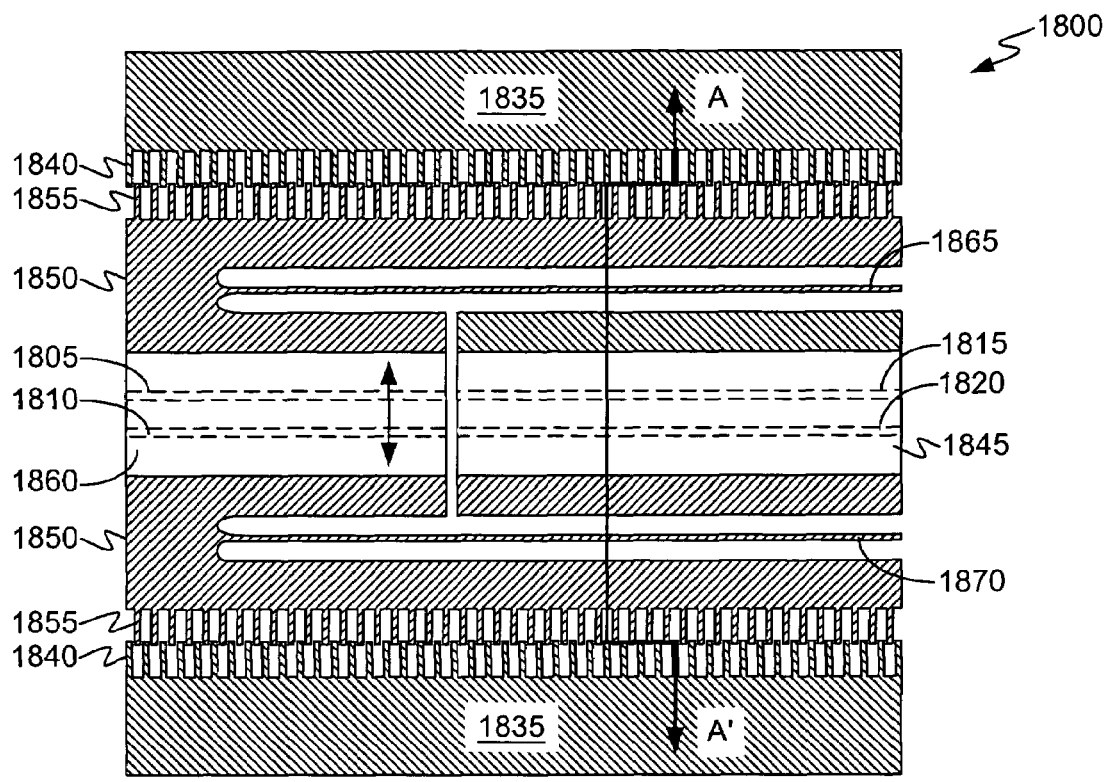
FIGS. 18A and 18B are plan views of a portion of an exemplary VOA 1800 with 2 channels.
Figure 18B:
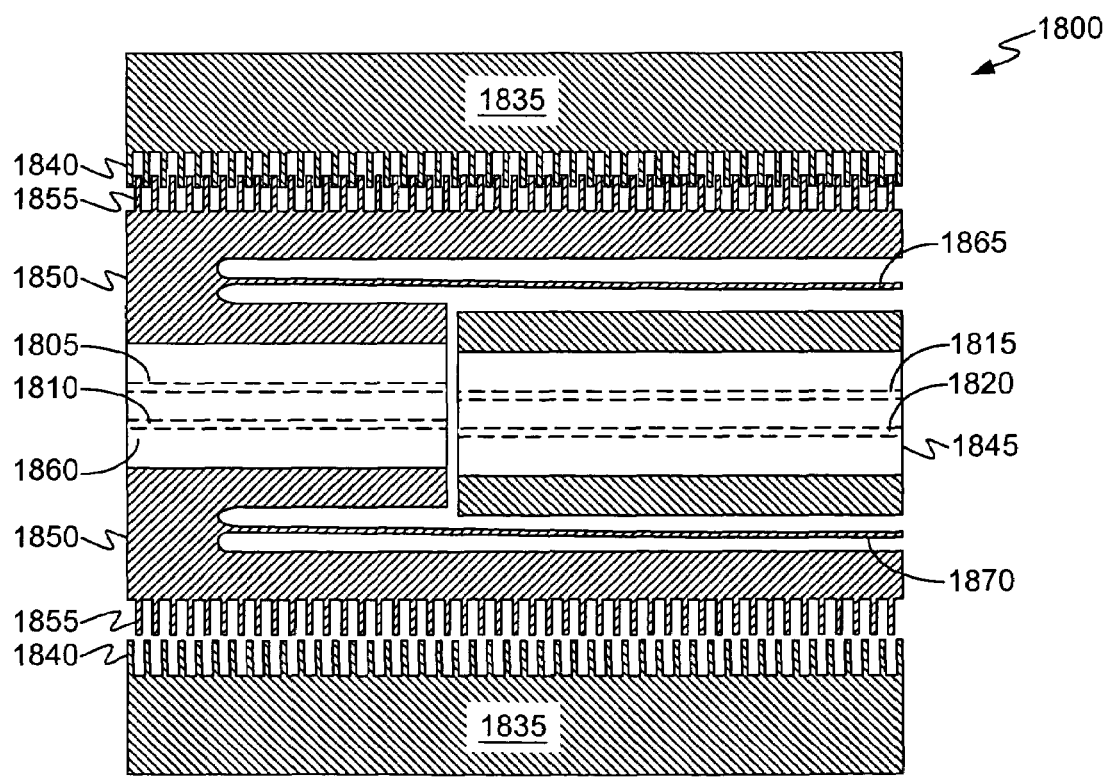

FIGS. 18A and 18B are plan views of a portion of an exemplary VOA 1800. FIG. 18 viewed in conjunction with FIGS. 19A–19W illustrates a fabrication sequence that may be employed to form various actuator structures disclosed herein.

VOA 1800 includes a pair of stationary waveguide segments 1805 and 1810 and a corresponding pair of movable waveguide segments 1815 and 1820. Stationary combs 1835, including teeth 1840, are rigidly connected to stationary waveguide segments 1815 and 1820 via a support 1845 and an underlying substrate (see FIGS. 19A–9W). Movable combs 1850, including teeth 1855, are rigidly connected to moveable waveguide segments 1805 and 1810 via a support 1860, which is in turn movably connected to the underlying substrate via a pair of hinges 1865 and 1870. Movable waveguide segments 1805 and 1810 can be moved relative to stationary waveguide segments 1815 and 1820 by applying appropriate voltages across the movable and fixed combs. FIG. 18B depicts VOA 1800 with waveguide segments misaligned.

Figure 19A:
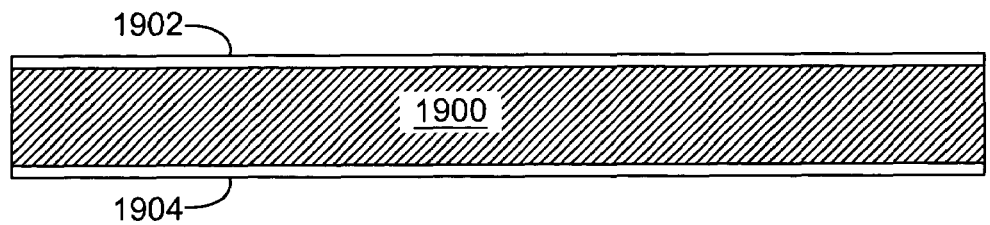
FIGS. 19A–19W depict a process sequence in accordance with an embodiment of the invention.
Figure 19B:
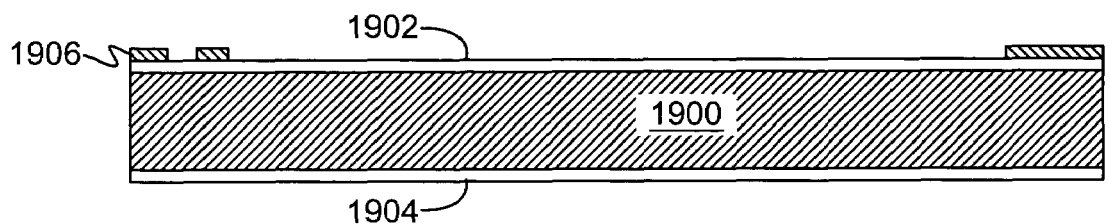
Figure 19C:
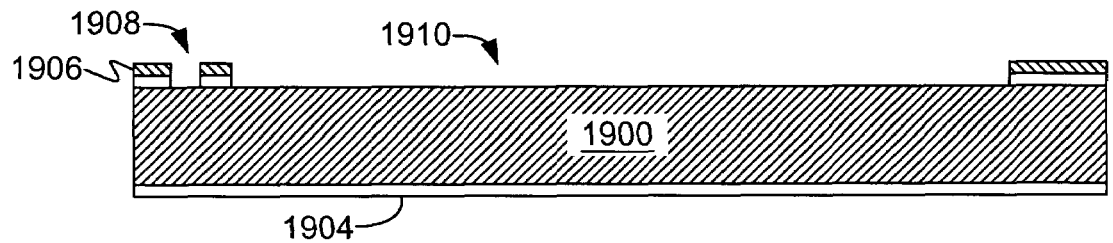
Figure 19D:
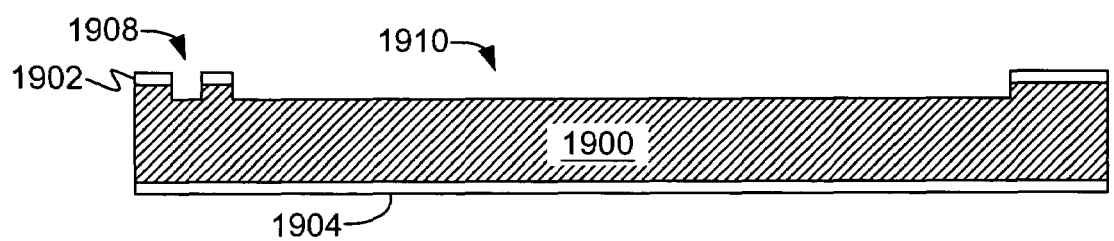
Figure 19E:
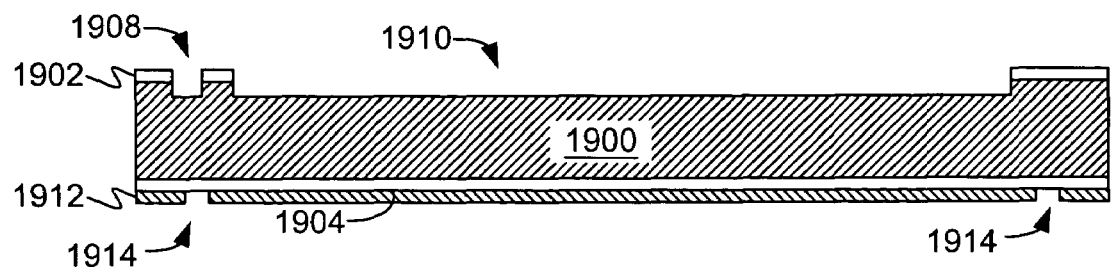
Figure 19F:
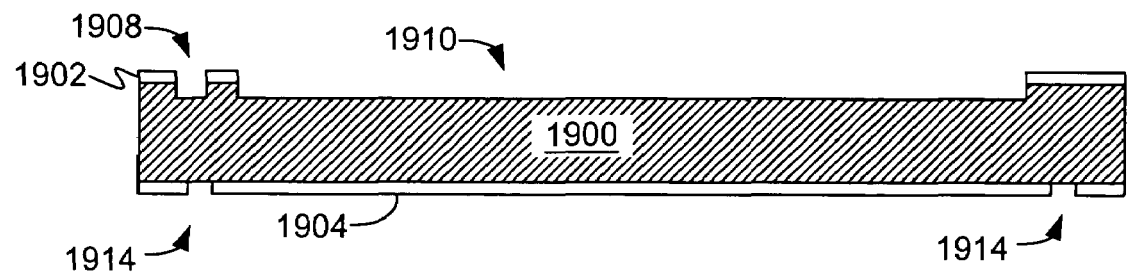
Figure 19G:
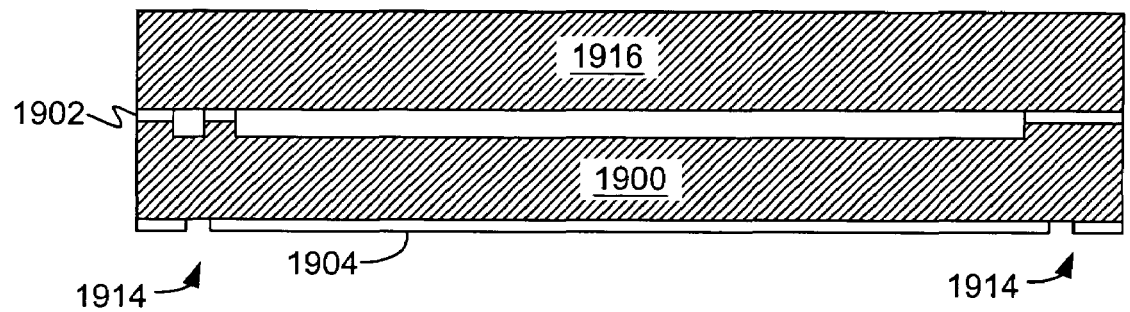
Figure 19H:
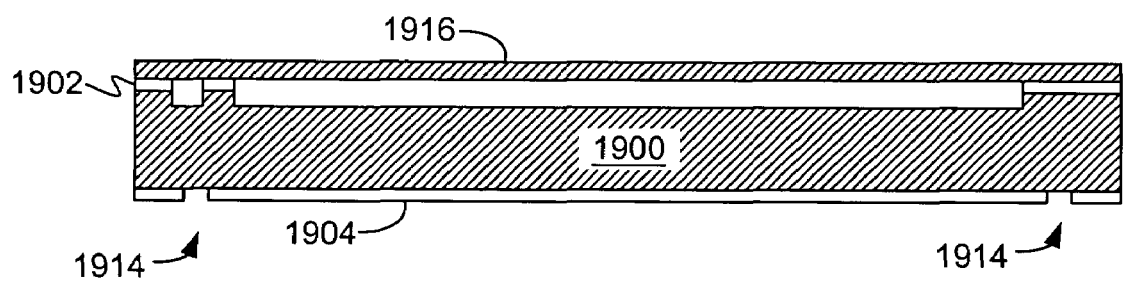
Figure 19I:
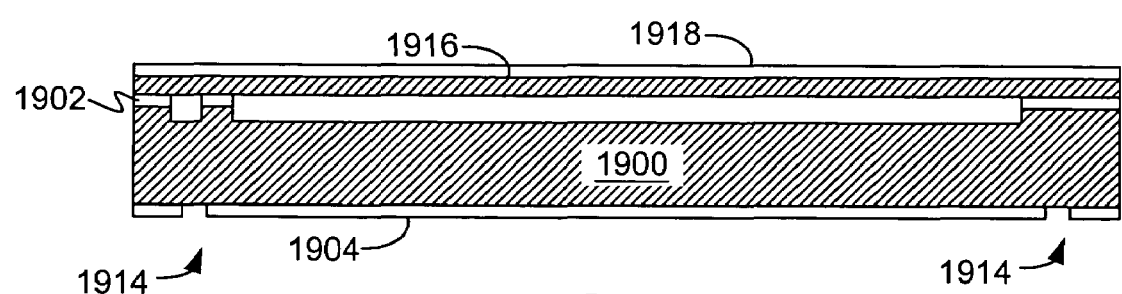
Figure 19J:
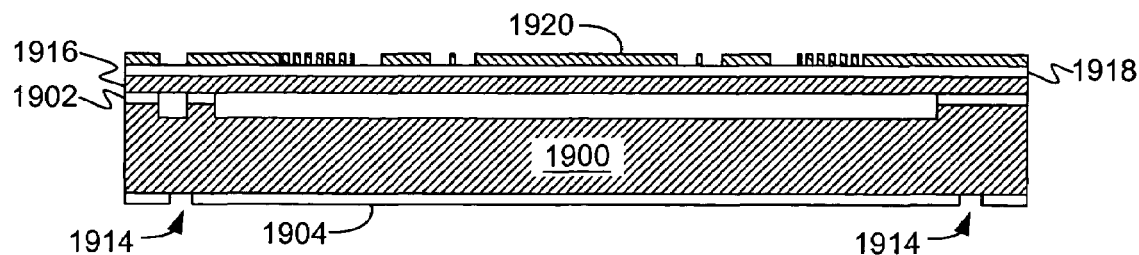
Figure 19K:
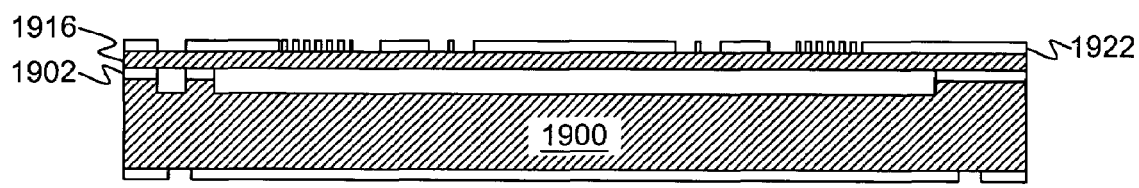
Figure 19L:
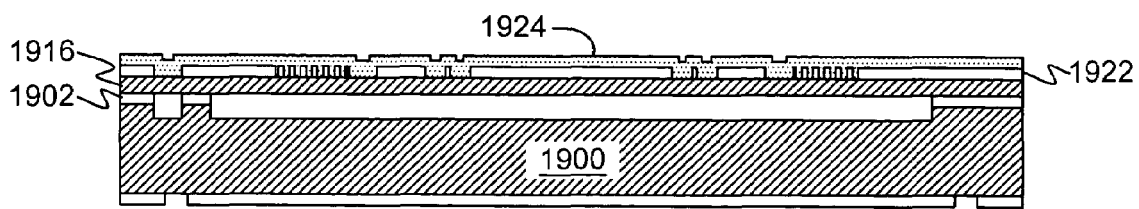
Figure 19M:
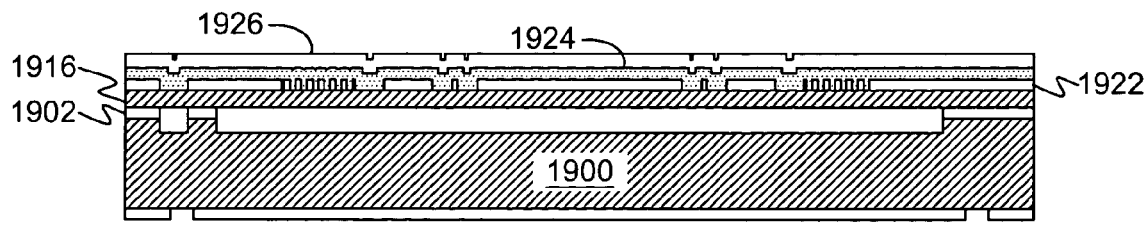
Figure 19N:
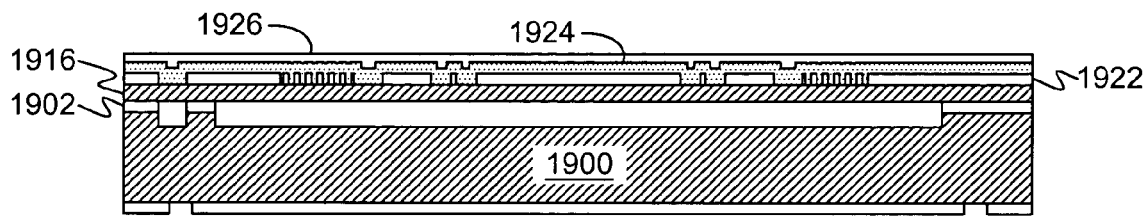
Figure 19O:
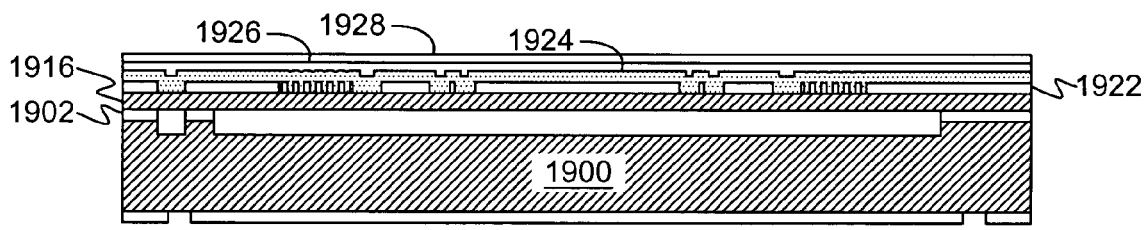
Figure 19P:
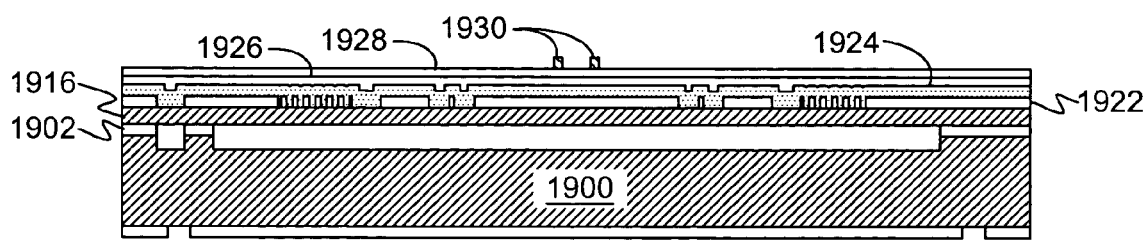
Figure 19Q:
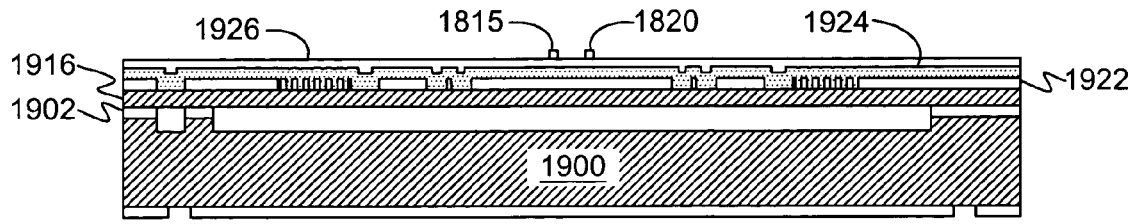
Figure 19R:
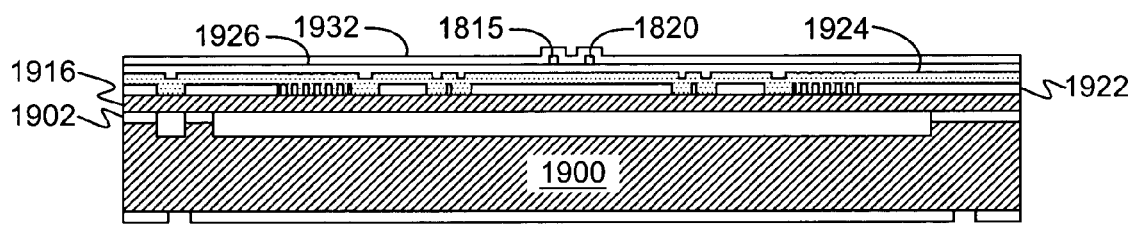
Figure 19S:
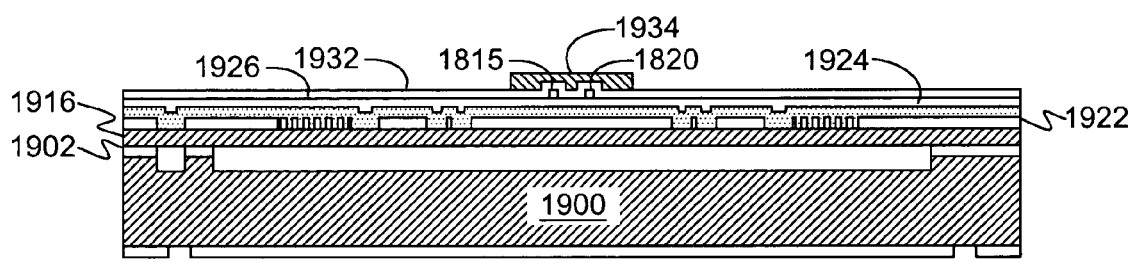
Figure 19T:
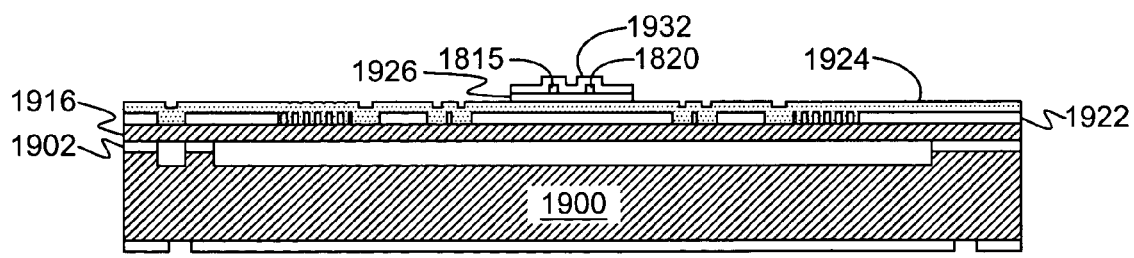
Figure 19U:
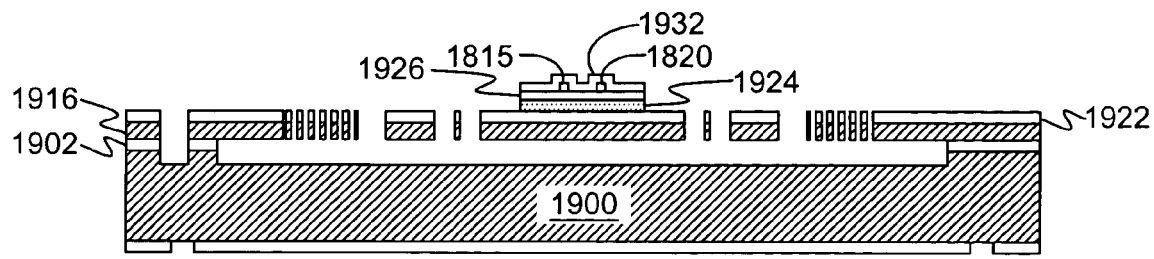
Figure 19V:
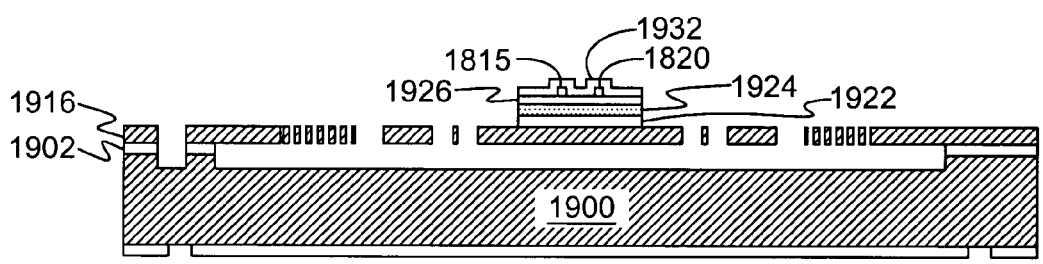
Figure 19W:
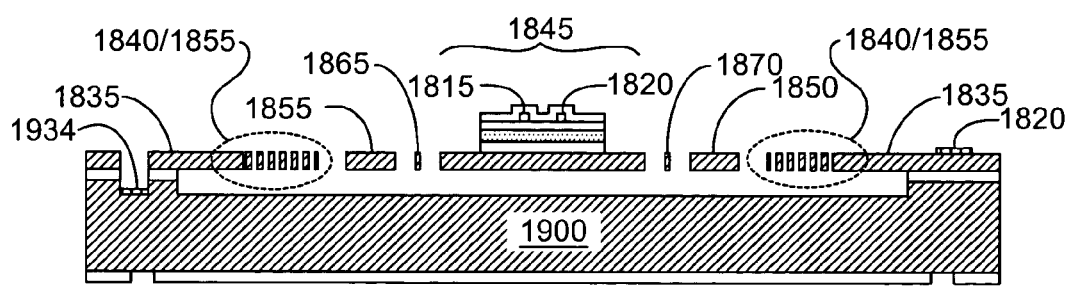

FIGS. 19A–19W depict a process sequence in accordance with an embodiment of the invention. The process sequence can be employed to fabricate actuators of the type described above. In this specific example, the resulting structure appears similar to the device of FIG. 18A cut along line A-A'. The following is a summary of this exemplary process sequence.

FIG. 19A: A heavily doped (n- or p-type) silicon wafer 1900 is oxidized to include top and bottom silicon dioxide layers 1902 and 1904, each about 1 um thick.

FIG. 19B: A patterned photoresist layer 1906 exposes wafer 1900 to define a contact region 1908 and an actuator region 1910 over which will be formed the movable and stationary combs.

FIG. 19C: The exposed portions of oxide layer 1902 are removed by dry etching.

FIG. 19D: The resulting structure is subjected to a reactive-ion etch to remove as much as about 5 um of the exposed surface of wafer 1900 and photoresist layer 1906 is removed.

FIG. 19E: Oxide layer 1904 is masked, using a photoresist layer 1912, to produce alignment-mark patterns 1914.

FIG. 19F: The exposed portions of oxide layer 1904 are removed by dry etching and photoresist layer 1912 (FIG. 19E) is removed.

FIG. 19G: A second, un-patterned, silicon wafer 1916 is bonded to oxide layer 1902.

FIG. 19H: Wafer 1916 is thinned, to about 20 um in one example.

FIG. 19I: A metal (e.g., tungsten) layer 1918 is deposited over wafer 1916. Metal layer 1918 can be up to about 0.5 um in one embodiment.

FIG. 19J: A patterned photoresist layer 1920 exposes metal layer 1918 to define an actuator. The actuator will eventually include a driving mechanism (e.g., moving and fixed combs) and a suspension mechanism (e.g., flexible hinges).

FIG. 19K: Metal layer 1918 is etched away and photoresist layer 1920 removed, leaving a metal mask 1922.

FIG. 19L: An optional barrier film 1924 of aluminum oxide, silicon nitride, etc. can be added to protect metal mask 1922 and act as etch stop during step 19T.

FIG. 19M: A cladding layer 1926 of e.g. undoped silicon dioxide is deposited over barrier film 1924. Layer 1926 is e.g. 15 um in one example.

FIG. 19N: In an optional step, cladding layer 1926 is planarized.

FIG. 19O: A layer of waveguide core material 1928, e.g. doped silicon dioxide, is deposited over cladding layer 1926 to a thickness of e.g. 6 um.

FIG. 19P: A patterned photoresist layer 1930 protects core material 1928 to define a pair of waveguides.

FIG. 19Q: A reactive ion etch removes the exposed core material, leaving a pair of waveguides 1815 and 1820. The residual mask defined in photoresist layer 1930 (FIG. 19P) is then removed. Waveguides 1815 and 1820, along with other elements in the 1800 series of numbers, identify corresponding elements in FIGS. 18A and 18B.

FIG. 19R: A second cladding layer 1932 of e.g. undoped silicon dioxide is deposited over barrier film cladding layer 1926 and waveguides 1815 and 1820 to a depth of e.g. 6 to 10 uM.

FIG. 19S: A patterned photoresist or alternate masking material 1934 is defined over waveguides 1815 and 1820.

FIG. 19T: A reactive-ion etch removes exposed portions of cladding layers 1926 and 1932. Photoresist or alternate material 1934 is then removed.

FIG. 19U: A reactive ion etch removes exposed portions of barrier film 1924. Another reactive ion etch is used to etch silicon layer 1916, using metal mask 1922. In another embodiment, cladding layer 1926 is formed over a blocking layer of e.g. nitride or $Al_2O_3$ that prevents formation of cladding layer 1926 in the undesired areas.

FIG. 19V: Metal mask 1922 is etched away.

FIG. 20W: Contacts 1934 and 1936 are metallized using a shadow mask. Alternatively, contacts 1934 and 1936 can be added to the structure of FIG. 19U. The completed structure of FIG. 19W corresponds to the plan view of FIG. 18A taken along line A-A', like numbered elements being the same or similar.

Figure 20A:
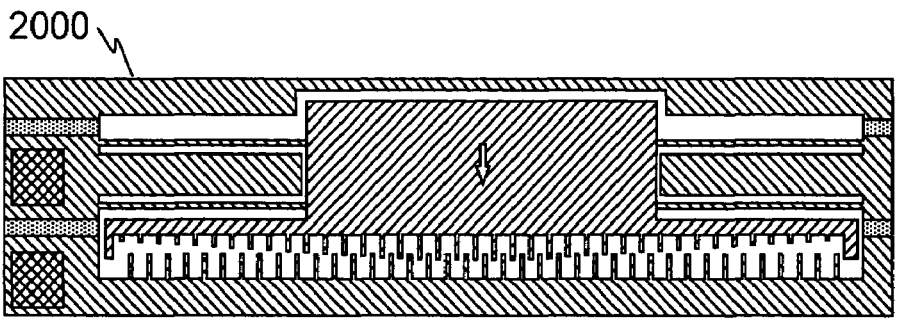
FIG. 20A is a plan view of a switch 2000 in accordance with another embodiment.

FIG. 20A is a plan view of a unidirectional switch 2000 in accordance with another embodiment. Switch 2000 employs a translational comb actuator having teeth of varying length. Configured as shown, the longer teeth begin to interdigitate before the shorter teeth as voltage is applied, with more teeth coming into play as the force required to flex the hinges increases. As a consequence, switch 2000 responds somewhat linearly to the applied driving voltage.

Figure 20B:
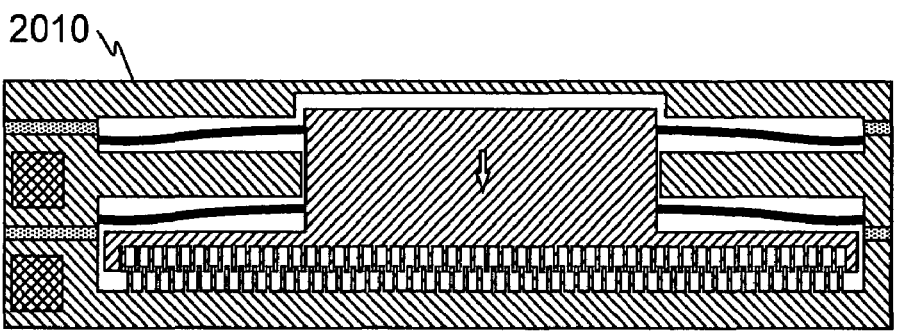
FIG. 20B is a plan view of a switch 2010 in accordance with another embodiment.

FIG. 20B is a plan view of a unidirectional switch 2010 in accordance with another embodiment. Switch 2010 employs a translational comb actuator having teeth of like length but pre-bent hinges in initial state without any voltage applied.

Figure 20C:
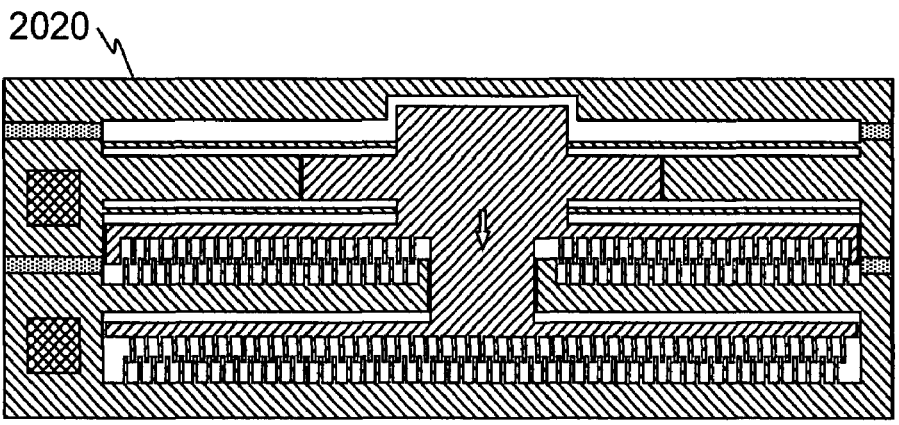
FIG. 20C is a plan view of a switch 2020 in accordance with another embodiment.

FIG. 20C is a plan view of a unidirectional switch 2020 in accordance with another embodiment. Switch 2020 employs two sets of combs to increase the force provided to flex the hinges.

Figure 20D:
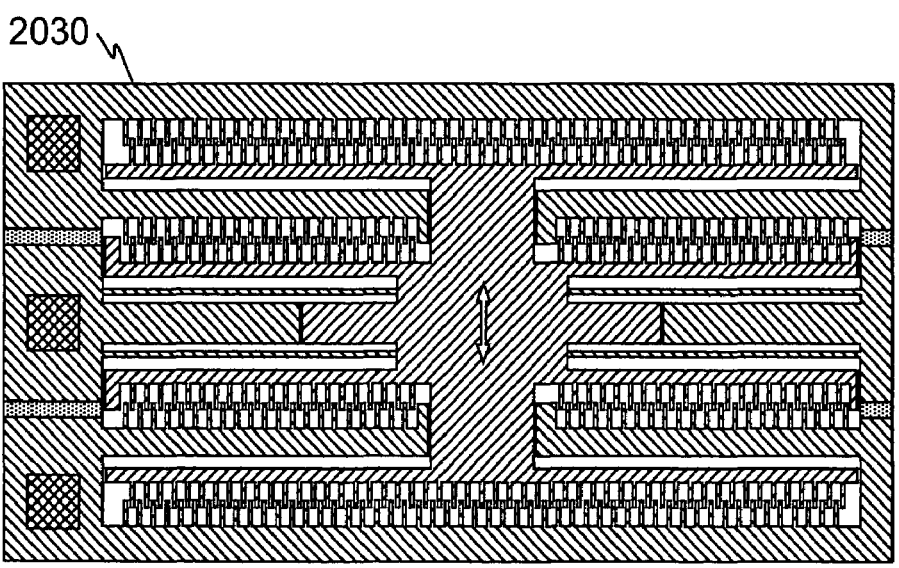
FIG. 20D is a plan view of a switch 2030 in accordance with still another embodiment.

FIG. 20D is a plan view of a bi-directional switch 2030 in accordance with still another embodiment. Switch 2030 includes two sets of comb actuators that together provide attractive force in two directions.

Figure 21:
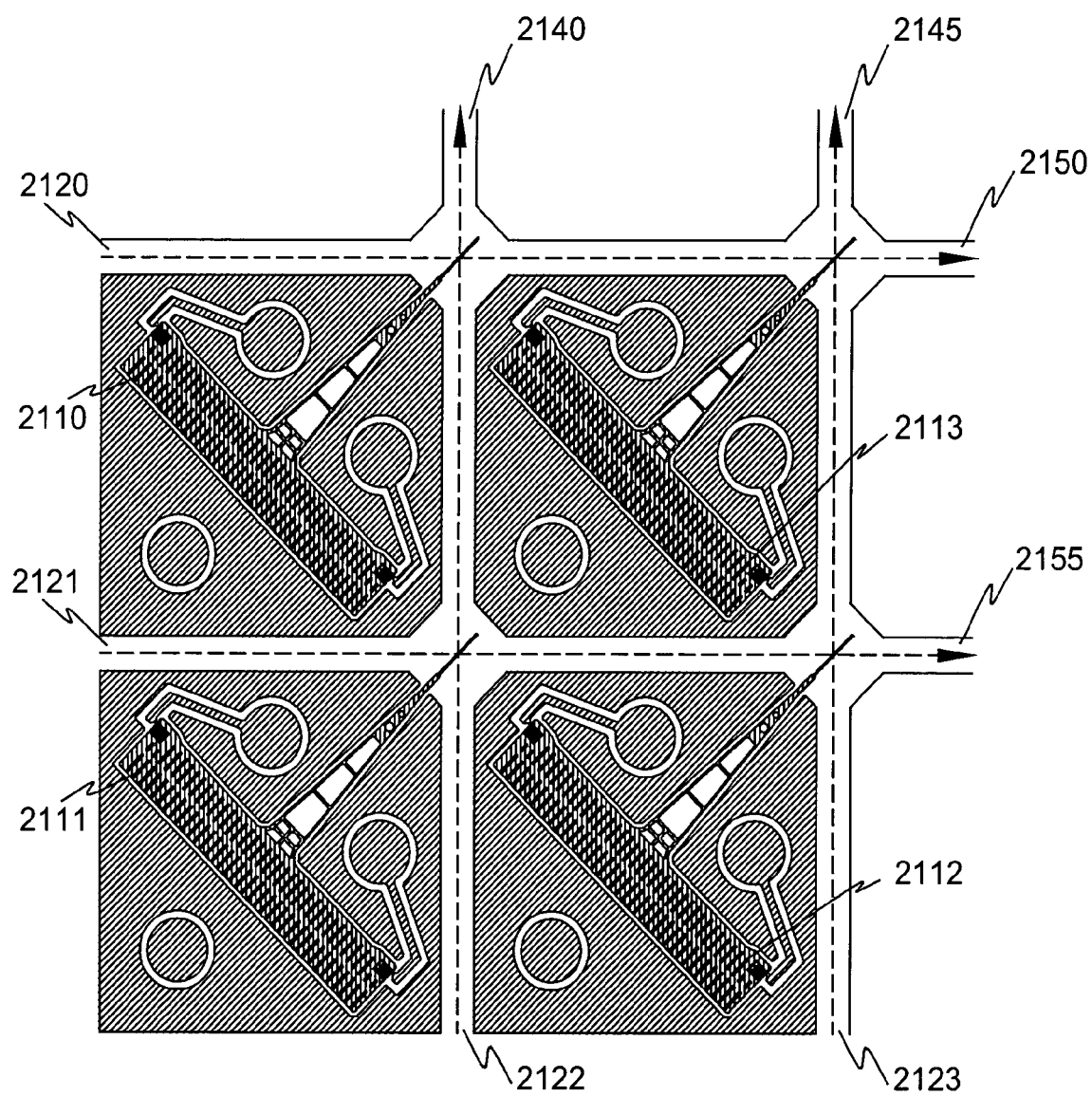
FIG. 21 is a plan view of two-dimensional switching array of actuators with add-drop functionality.

FIG. 21 depicts another embodiment of ROADM with a two-dimensional N×N array of blade actuators, using N=2 for simplicity. The actuators 2110, 2111, 2112, and 2113 receive optical signals 2120, 2121, 2122, and 2123 that can be directed into outputs 2140, 2145, 2150, and 2155. Optical signals can propagate through this two-dimensional array in free space or through optical waveguides. In the case of free space propagation, all four side of the actuator array are surrounded with collimating one dimensional fiber-lens assemblies.

Add-drop functionality can be illustrated by assigning optical signals 2120 and 2121 to be input channels, 2122 and 2123 to be add channels, 2150 and 2155 to be output channels, and signals 2140 and 2145 to be drop channels. When, for example, signal 2120 is to be passed through the ROADM to output 2150, signal 2121 is to be passed to drop channel 2140, and signal 2122 is to be added to channel 2155, actuators 2110, 2113, and 2112 are set to a transmissive state and actuator 2111 is set to a reflective state. Other combinations of adds and drops can be accomplished by appropriate setting of actuators into their respective reflective and transmissive states.

While the present invention has been described in connection with specific embodiments, variations of these embodiments will be obvious to those of ordinary skill in the art. For example, 1. Electromagnetically, piezoelectrically, or thermally driven actuators can be used;
2. Bulk micromachining methods described above can be substituted with surface micromachining methods;
3. Other materials can be used for waveguides, such as silicon, indium phosphide, etc.
4. Other materials can be used as masks or etch stops such as titanium if processing involves high temperatures or aluminum if lower processing temperatures are employed.
5. In attenuators that rely upon the alignment of opposing waveguide segments, both segments can be actuated.
6. Optical waveguides include constant cross section waveguides, tapered waveguides, conventional single-mode and multimode optical fibers, lensed and grin fibers with straight or angled facets, with or without antireflective coatings. Lensed and grin fibers allow larger fiber-to-fiber propagation distances than normal cleaved fibers with simpler fabrication and wider tolerances while keeping insertion losses to minimum.

Moreover, some components are shown directly connected to one another while others are shown connected via intermediate components. In each instance the method of interconnection establishes some desired electrical communication between two or more circuit nodes, or terminals. Such communication may often be accomplished using a number of circuit configurations, as will be understood by those of skill in the art. Therefore, the spirit and scope of the appended claims should not be limited to the foregoing description.

What is claimed is:

1. A device comprising:
    a. a stationary waveguide segment having a stationary end facet;
    b. a first movable waveguide segment having a first movable end facet opposite the stationary end facet and separated from the stationary end facet by a gap;
    c. a second movable waveguide segment having a second movable end facet; and
    d. an analog actuator connected to the first and second movable waveguide segments and varying an extent of alignment between the first movable end facet and the stationary end facet;
    e. wherein the device supports a first switch position in which the actuator aligns the first movable end facet with the stationary end facet and a second switch position in which the second movable end facet is aligned with the stationary end facet; and
    f. wherein the actuator varies the extent of alignment between the first movable end facet and the stationary end facet in the first switch position.

2. The device of claim 1, the actuator including first and second control terminals receiving an analog control signal.

3. The device of claim 2, wherein a portion of a light beam passes through the gap, the device further comprising feedback circuitry controlling the extent of alignment between the movable and stationary end facets based on an intensity of the portion of the light beam.

4. The device of claim 1, wherein the actuator varies a second extent of alignment between the second movable end facet and the stationary end facet in the second switch position.

5. The device of claim 1, wherein the first movable waveguide segment intersects the second movable waveguide segment.

6. The device of claim 1, wherein the first movable waveguide segment extends through the second movable waveguide segment.

7. The device of claim 1, wherein the stationary waveguide segment defines an optical path, and wherein the stationary end facet is at an acute angle with respect to the optical path.

8. A device comprising:
    a. a first stationary waveguide segment having a first stationary end facet;
    b. a second stationary waveguide segment having a second stationary end facet;
    c. a first movable waveguide segment having a first movable end facet;
    d. a second movable waveguide segment having a second movable end facet; and
    e. an analog actuator connected to the first and second movable waveguide segments, the analog actuator supporting at least two switch positions, including a first switch position in which the first stationary end facet is aligned to a first extent with the first movable end facet and a second switch position in which the first stationary end facet is aligned to a second extent with the second movable end facet;
    f. wherein the first extent of alignment varies over an alignment range.

9. The device of claim 8, wherein a beam of light passes between the first stationary end facet and the first movable end facet in the first switch position, the device further comprising a power detector monitoring the beam of light.

10. The device of claim 9, wherein the power detector is a portion of a feedback circuit controlling the first extend extent to which the first stationary end facet is aligned with the first movable end facet in the first switch position.

11. The device of claim 10, wherein a second beam of light passes between the first stationary end facet and the second movable end facet in the second switch position, the device further comprising a second power detector monitoring the second beam of light.

12. A monolithic optical device comprising:
a. a substrate;
b. an optical demultiplexer formed on the substrate and separating a light beam into a plurality of channels;
c. a first plurality of waveguides formed on the substrate, each waveguide including a respective first end facet and conveying at least one of the channels;
d. a plurality of switches formed on the substrate, each switch including:
  i. a movable waveguide disposed on the substrate and defining a first optical path for the respective channel, the movable waveguide having a second end facet disposed opposite one of the first end facets in a first switch position and receiving a portion of the respective channel, and disposed opposite another of the first end facets in a second switch position; and
  ii. a variable actuator having electrical contacts receiving a control signal, wherein the control signal varies over a range of control-signal magnitudes in the first switch position;
wherein the actuator varies the extent of alignment between the first movable end facet and the stationary end facet in the first switch position.

13. The device of claim 12, wherein the first and second end facets are aligned in the first switch position to a degree of alignment that is proportional to the control-signal magnitude, such that changes in the control signal change the degree of alignment.

14. The device of claim 12, further comprising an optical multiplexer formed on the substrate and including a plurality of input channels, each input channel connected to one of the plurality of movable waveguides.

15. The device of claim 12, wherein each of the switches includes a second movable waveguide intersecting the first-mentioned movable waveguide.

16. The device of claim 15, wherein the first movable waveguide extends through the second movable waveguide.

17. The device of claim 12, wherein the stationary waveguide defines an optical path, and wherein the stationary end facet is at an acute angle with respect to the optical path.

18. A method comprising:
a. aligning a first end facet of a first waveguide segment with a second end facet of a second waveguide segment;
b. passing a light beam through the first waveguide segment, the first end facet, and the second end facet so a portion of the light beam enters the second waveguide segment;
c. monitoring an intensity of the portion of the light beam to develop a feedback signal;
d. realigning the first and second end facets in response to the feedback signal; and
e. aligning the first end facet with a third end facet of a third waveguide segment so a second portion of the light beam enters the third waveguide segment;
wherein an actuator varies the extent of alignment between the first end facet and the second end facet in response to the feedback signal.

19. The method of claim 18, further comprising aligning the first end facet with a third end facet of a third waveguide segment so a second portion of the light beam enters the third waveguide segment.

20. The method of claim 19, further comprising:
a. monitoring a second intensity of the second portion of the light beam to develop a second feedback signal; and
b. realigning the first and third end facets in response to the second feedback signal.

21. The method of claim 20, further comprising aligning a fourth end facet of a fourth waveguide segment with the second end facet of the second waveguide segment while aligning the first and third end facets.

* * * * *